US011743322B2

(12) United States Patent
Kimura et al.

(10) Patent No.: US 11,743,322 B2
(45) Date of Patent: Aug. 29, 2023

(54) COMMUNICATION DEVICE AND COMMUNICATION METHOD

(71) Applicant: Sony Group Corporation, Tokyo (JP)

(72) Inventors: Ryota Kimura, Tokyo (JP); Hiroaki Takano, Tokyo (JP); Hirofumi Kasai, Tokyo (JP); Ryo Sawai, Tokyo (JP); Fumio Teraoka, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/618,499

(22) PCT Filed: Jul. 10, 2020

(86) PCT No.: PCT/JP2020/027140
§ 371 (c)(1),
(2) Date: Dec. 13, 2021

(87) PCT Pub. No.: WO2021/015021
PCT Pub. Date: Jan. 28, 2021

(65) Prior Publication Data

US 2022/0239726 A1 Jul. 28, 2022

(30) Foreign Application Priority Data

Jul. 19, 2019 (JP) ................................ 2019-134106

(51) Int. Cl.
*H04L 67/10* (2022.01)
*H04L 67/02* (2022.01)
*H04L 41/40* (2022.01)

(52) U.S. Cl.
CPC .............. *H04L 67/10* (2013.01); *H04L 41/40* (2022.05); *H04L 67/02* (2013.01)

(58) Field of Classification Search
CPC ....... G06F 2009/45595; G06F 9/45558; H04L 63/20; H04L 41/40
See application file for complete search history.

(56) References Cited

U.S. PATENT DOCUMENTS 10,116,553 B1 10/2018 Penno
11,349,729 B2 * 5/2022 Tavernier ............ H04L 41/0896
(Continued)

FOREIGN PATENT DOCUMENTS

JP 2016-46736 A 4/2016
WO 2018/079440 A1 5/2018
WO 2019/116928 A1 6/2019

OTHER PUBLICATIONS

Rijsman Moisand Juniper Networks B: "Metadata Considerations; draft-rijsman-sfc-metadata-considerations-00.txt", Metadata Considerations; Draft-Rijsman-SFC-Metadata-Considerations-00.TXT, Internet Engineering Task Force, IETF; Standardworkingdraft, Internet Society (ISOC) 4, Rue Des Falaises CH-1205 Geneva, Switzerland, Feb. 13, 2014 (Feb. 13, 2014), pp. 1-30, XP015096689.
(Continued)

*Primary Examiner* — Chirag R Patel
(74) *Attorney, Agent, or Firm* — XSENSUS LLP

(57) ABSTRACT

A communication device (100) which operates as an application node which executes one or a plurality of applications includes: a communication unit (110) that executes communication with another logical node; and a control unit (130) that controls communication by the communication unit (110). The another logical node is a node which is applied with application function chaining (AFC) in which, in transmission/reception of an application message with the application node as a transmission source or a transmission destination, one or a plurality of application functions act on the application message midway along a path of the transmission/reception, and the control unit (130) causes the
(Continued)

communication unit (110) to transmit, to the another logical node, a message according to a publishing/subscription model in order to transmit and receive the application message on which the one or the plurality of application functions act.

4 Claims, 59 Drawing Sheets

(56) References Cited

U.S. PATENT DOCUMENTS

| | | | | |
|---|---|---|---|---|
| 2015/0063166 | A1* | 3/2015 | Sif | H04L 41/40 455/418 |
| 2017/0331669 | A1 | 11/2017 | Ganesh | |
| 2018/0316724 | A1* | 11/2018 | Reddy | H04L 9/0827 |
| 2019/0081894 | A1* | 3/2019 | Yousaf | H04L 45/745 |
| 2019/0349268 | A1* | 11/2019 | Pai | H04M 15/00 |

OTHER PUBLICATIONS

International Search Report and Written Opinion dated Oct. 13, 2020, received for PCT Application PCT/JP2020/027140, Filed on Jul. 10, 2020, 8 pages including English Translation.

Sato, "Application Function Chaining Infrastructure for Commercial Off-The-Shelf Devices", IPSJ SIG Technical Reports: Distributed Processing System, May 16, 2019, 9 pages.

Halpern et al., "Service Functioning Chaining (SFC) Architecture", Internet Engineering Task Force, Oct. 2015, 32 pages.

* cited by examiner

FIG.4

| |
|---|
| Packet Type = Gate Setup Request |
| Gate Type = Ingress |
| User ID = UID-usr0 |
| Credential = Cred-usr0 |
| IP Address = IP-gtn1 |

FIG.5

| |
|---|
| Packet Type = Gate Setup Response |
| Status = OK |
| AF ID = AFID-gt1 |
| Data Port = DPt-gt1-app |
| Gate Session Key = SKey-usr0-gt1 |

FIG.6

| |
|---|
| Packet Type = Gate AA Request |
| User ID = UID-usr0 |
| Credential = Cred-usr0 |
| IP Address = IP-gtn1 |

FIG.7

| |
|---|
| Packet Type = Gate AA Response |
| Status = OK |

FIG.8

| |
|---|
| Packet Type = Data Port Notification |
| Data Port = DPt-gt1-app |

FIG.9

| |
|---|
| Packet Type = Accounting Notification |
| User ID = UID-usr0 |
| Usage = Gate Setup |
| AF ID = AFID-gt1 |
| AFC ID = [null] |

FIG.11

Ingress Table (Gate Daemon1)

| |
|---|
| AFC Session Key = [undef] |
| App Data Port = DPt-gt1-app |
| No of Input Apps = 0 |
| Data Output Socket = [undef] |

FIG.12

Egress Table (Gate Daemon2)

| |
|---|
| AFC Session Key = [undef] |
| App Data Port = DPt-gt2-app |
| No of Data Input Sockets = 0 |
| No of Output Apps = 0 |

FIG.14

| |
|---|
| Packet Type = AF Setup Request |
| User ID = UID-usr0 |
| Credential = Cred-usr0 |
| IP Address = IP-afn1 |
| AF Name = AFName-af1 |
| AF Parameter = AFParam-af1 |

FIG.15

| |
|---|
| Packet Type = AF Setup Response |
| Status = OK |
| AF ID = AFID-af1 |
| AF Session Key = SKey-usr0-af1 |

FIG.16

| |
|---|
| Packet Type = AF AA Request |
| User ID = UID-usr0 |
| Credential = Cred-usr0 |
| IP Address = IP-afn1 |
| AF Name = AFName-af1 |

FIG.17

| |
|---|
| Packet Type = AF AA Response |
| Status = OK |

FIG.18

| |
|---|
| Packet Type = AF Invoke Request |
| AF Name = AFName-af1 |
| AF Parameter = AFParam-af1 |

FIG.19

| |
|---|
| Packet Type = AF Invoke Response |
| Status = OK |

FIG.20

| |
|---|
| Packet Type = Accounting Notification |
| User ID = UID-usr0 |
| Usage = AF Setup |
| AF ID = AFID-af1 |
| AFC ID = [null] |

FIG.22

AFC Table (AFC Daemon1)

| |
|---|
| Control Socket = CSock-af1-mgr |
| AF Data Input Port = Pt-af1-input |
| AF Data Output Port = Pt-af1-output |
| AF Status Port = Pt-af1-stat |
| No of Data Input Sockets = 0 |
| No of Data Output Sockets = 0 |
| Operator = [undef] |
| Operand = [undef] |
| True Data Output Socket Index = [undef] |
| False Data Output Socket Index = [undef] |

FIG.23

AFC Table (AFC Daemon2)

| |
|---|
| Control Socket = CSock-af2-mgr |
| AF Data Input Port = Pt-af2-input |
| AF Data Output Port = Pt-af2-output |
| AF Status Port = Pt-af2-stat |
| No of Data Input Sockets = 0 |
| No of Data Output Sockets = 0 |
| Operator = [undef] |
| Operand = [undef] |
| True Data Output Socket Index = [undef] |
| False Data Output Socket Index = [undef] |

FIG.24

AFC Table (AFC Daemon3)

| |
|---|
| Control Socket = CSock-af3-mgr |
| AF Data Input Port = Pt-af3-input |
| AF Data Output Port = Pt-af3-output |
| AF Status Port = Pt-af3-stat |
| No of Data Input Sockets = 0 |
| No of Data Output Sockets = 0 |
| Operator = [undef] |
| Operand = [undef] |
| True Data Output Socket Index = [undef] |
| False Data Output Socket Index = [undef] |

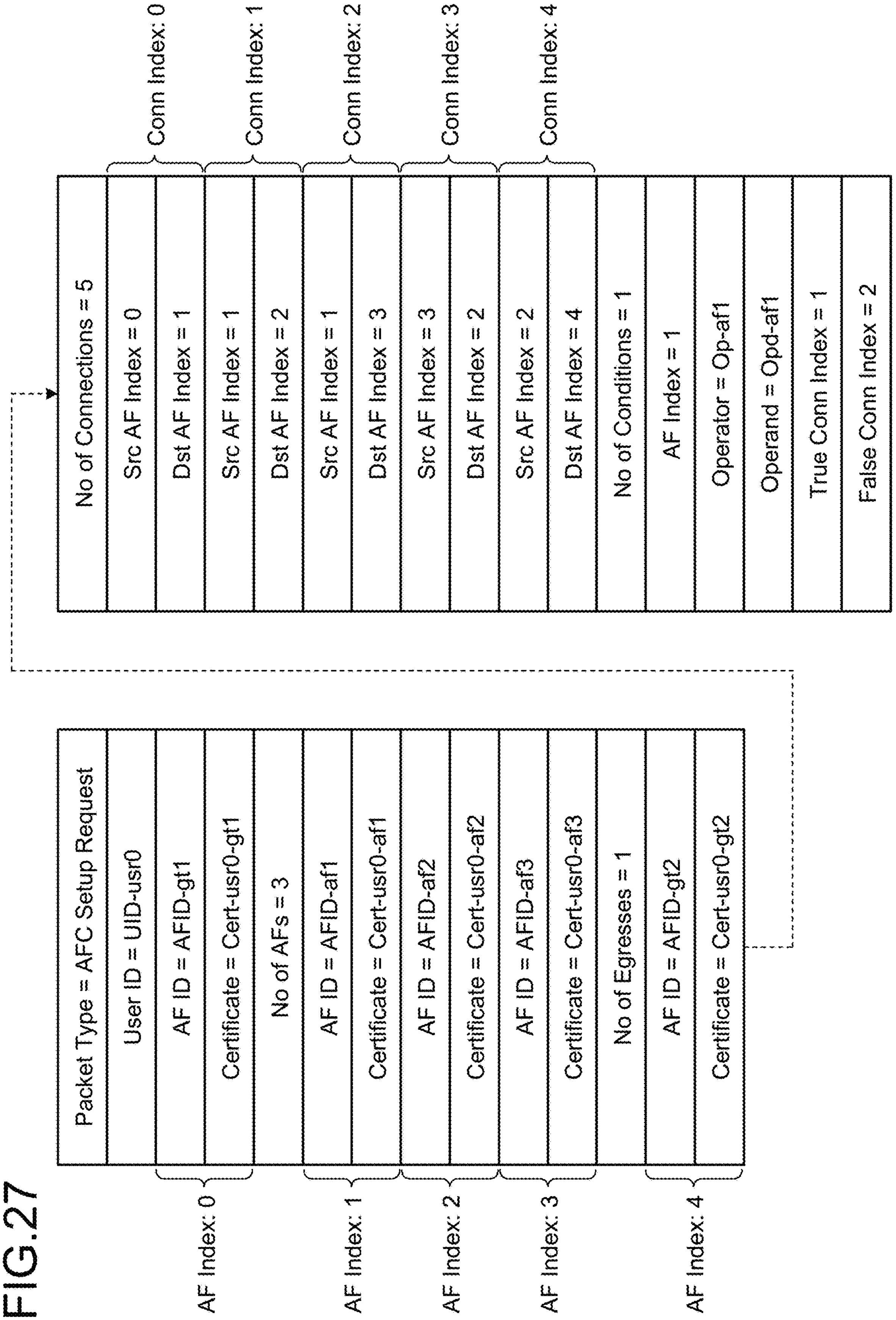

FIG.27

Packet (top block, left-to-right):
- Packet Type = AFC Setup Request
- User ID = UID-usr0
- AF Index: 0: AF ID = AFID-gt1; Certificate = Cert-usr0-gt1
- No of AFs = 3
- AF Index: 1: AF ID = AFID-af1; Certificate = Cert-usr0-af1
- AF Index: 2: AF ID = AFID-af2; Certificate = Cert-usr0-af2
- AF Index: 3: AF ID = AFID-af3; Certificate = Cert-usr0-af3
- No of Egresses = 1
- AF Index: 4: AF ID = AFID-gt2; Certificate = Cert-usr0-gt2

Connection table (bottom block):
- No of Connections = 5
- Conn Index: 0: Src AF Index = 0, Dst AF Index = 1
- Conn Index: 1: Src AF Index = 1, Dst AF Index = 2
- Conn Index: 2: Src AF Index = 1, Dst AF Index = 3
- Conn Index: 3: Src AF Index = 3, Dst AF Index = 2
- Conn Index: 4: Src AF Index = 2, Dst AF Index = 4
- No of Conditions = 1
- AF Index = 1
- Operator = Op-af1
- Operand = Opd-af1
- True Conn Index = 1
- False Conn Index = 2

FIG.28

| |
|---|
| Packet Type = AFC Setup Response |
| AFC ID = AFCID-afc1 |
| Status = OK |
| Data Port = DPt-gt1-app |
| AFC Session Key = SKey-usr0-afc1 |

FIG.29

| |
|---|
| Packet Type = Conn Estab P Request |

FIG.30

| |
|---|
| Packet Type = Conn Estab P Response |
| Status = OK |
| Data Port = DPt-af1-gt1 |

FIG.31

| |
|---|
| Packet Type = Conn Estab A Request |
| IP Address = IP-afn1 |
| Data Port = DPt-af1-gt1 |

FIG.32

| |
|---|
| Packet Type = Conn Estab A Response |
| Status = OK |
| Data Socket = DSock-gt1-af1 |

FIG.33

| |
|---|
| Packet Type = Set Condition Request |
| Operator = Op-af1 |
| Operand = Opd-af1 |
| True Data Socket = DSock-af1-af2 |
| False Data Socket = DSock-af1-af3 |

FIG.34

| |
|---|
| Packet Type = Set Condition Response |
| Status = OK |

FIG.35

| |
|---|
| Packet Type = Set Session Key Request |
| AFC Session Key = SKey-usr0-afc1 |

FIG.36

| |
|---|
| Packet Type = Set Session Key Response |
| Status = OK |

FIG.37

| |
|---|
| Packet Type = Accounting Notification |
| User ID = UID-usr0 |
| Usage = AFC Setup |
| AF ID = [null] |
| AFC ID = AFCID-afc1 |

FIG.39

Ingress Table (Gate Daemon1)

| |
|---|
| AFC Session Key = SKey-usr0-afc1 |
| App Data Port = DPt-gt1-app |
| No of Input Apps = 0 |
| Data Output Socket = DSock-gt1-af1 |

FIG.40

Egress Table (Gate Daemon2)

| | |
|---|---|
| AFC Session Key = SKey-usr0-afc1 | |
| App Data Port = DPt-gt2-app | |
| No of Data Input Sockets = 1 | |
| Data Input Socket = DSock-gt2-af2 | Input Sock: 0 |
| No of Output Apps = 0 | |

FIG.41

AFC Table (AFC Daemon1)

| | |
|---|---|
| Control Socket = CSock-af1-mgr | |
| AF Data Input Port = Pt-af1-input | |
| AF Data Output Port = Pt-af1-output | |
| AF Status Port = Pt-af1-stat | |
| No of Data Input Sockets = 1 | |
| Data Input Socket = DSock-af1-gt1 | |
| No of Data Output Sockets = 2 | |
| Data Output Socket = DSock-af1-af2 | Data Output Socket Index: 0 |
| Data Output Socket = DSock-af1-af3 | Data Output Socket Index: 1 |
| Operator = Op-af1 | |
| Operand = Opd-af1 | |
| True Data Output Socket Index = 0 | |
| False Data Output Socket Index = 1 | |

FIG.42

AFC Table (AFC Daemon2)

| | |
|---|---|
| Control Socket = CSock-af2-mgr | |
| AF Data Input Port = Pt-af2-input | |
| AF Data Output Port = Pt-af2-outpu | |
| AF Status Port = Pt-af2-stat | |
| No of Data Input Sockets = 2 | |
| Data Input Socket = DSock-af2-af1 | Data Input Socket: 0 |
| Data Input Socket = DSock-af2-af3 | Data Input Socket: 1 |
| No of Data Output Sockets = 1 | |
| Data Output Socket = DSock-af2-gt2 | Data Output Socket Index: 0 |
| Operator = [null] | |
| Operand = [null] | |
| True Data Output Socket Index = 0 | |
| False Data Output Socket Index = [null] | |

FIG.43

AFC Table (AFC Daemon3)

| | |
|---|---|
| Control Socket = CSock-af3-mgr | |
| AF Data Input Port = Pt-af3-input | |
| AF Data Output Port = Pt-af3-output | |
| AF Status Port = Pt-af3-stat | |
| No of Data Input Sockets = 1 | |
| Data Input Socket = DSock-af3-af1 | |
| No of Data Output Sockets = 1 | |
| Data Output Socket = DSock-af3-af2 | Data Output Socket Index: 0 |
| Operator = [null] | |
| Operand = [null] | |
| True Data Output Socket Index = 0 | |
| False Data Output Socket Index = [null] | |

FIG.45

| |
|---|
| Packet Type = AFC Permission Request |
| AFC ID = AFCID-afc1 |
| Constructor ID = UID-usr0 |
| Certificate = Cert-usr0-afc1 |
| No of User IDs = 1 |
| User ID = UID-usr1 |

FIG.46

| |
|---|
| Packet Type = AFC Permission Response |
| Status = OK |

FIG.48

| |
|---|
| Packet Type = Get User Session Key Request |
| AFC ID = AFCID-afc1 |
| User ID = UID-usr1 |
| Credential = Cred-usr1 |

FIG.49

| |
|---|
| Packet Type = Get User Session Key Response |
| Status = OK |
| User Session Key = SKey-usr1-afc1 |
| Data Port = DPt-gt1-app |
| IP Address = IP-gtn1 |

FIG.50

| |
|---|
| Packet Type = AFC AA Request |
| AFC ID = AFCID-afc1 |
| User ID = UID-usr1 |
| Credential = Cred-usr1 |

FIG.51

| |
|---|
| Packet Type = AFC AA Response |
| Status = OK |

FIG.52

| |
|---|
| Packet Type = Set User Session Key Request |
| AFC ID = AFCID-afc1 |
| User ID = UID-usr1 |
| User Session Key = SKey-usr1-afc1 |

FIG.53

| |
|---|
| Packet Type = Set User Session Key Response |
| Status = OK |

FIG.54

Ingress Table (Gate Daemon1)

| | |
|---|---|
| AFC Session Key = SKey-usr-afc1 | |
| App Data Port = DPt-gt1-app | |
| No of Input Apps = 1 | |
| User ID = UID-usr1 | Input App: 0 |
| User Session Key = SKey-usr1-afc1 | |
| Data Input Socket = [undef] | |
| Data Output Socket = DSock-gt1-af1 | |

FIG.55

Egress Table (Gate Daemon2)

| | |
|---|---|
| AFC Session Key = SKey-usr0-afc1 | |
| App Data Port = DPt-gt2-app | |
| No of Data Input Sockets = 1 | |
| Data Input Socket = DSock-gt2-af2 | Input Sock: 0 |
| No of Output Apps = 1 | |
| User ID = UID-usr2 | Output App: 0 |
| User Session Key = SKey-usr2-afc1 | |
| Data Output Socket = [undef] | |

FIG.57

Ingress Table (Gate Daemon1)

| | |
|---|---|
| AFC Session Key = SKey-usr0-afc1 | |
| App Data Port = DPt-gt1-app | |
| No of Input Apps = 1 | |
| User ID = UID-usr1 | Input App: 0 |
| User Session Key = SKey-usr1-afc1 | |
| Data Input Socket = DSock-gt1-app1 | |
| Data Output Socket = DSock-gt1-af1 | |

FIG.58

Egress Table (Gate Daemon2)

| | |
|---|---|
| AFC Session Key = SKey-usr0-afc1 | |
| App Data Port = DPt-gt2-app | |
| No of Data Input Sockets = 1 | |
| Data Input Socket = DSock-gt2-af2 | Input Sock: 0 |
| No of Output Apps = 1 | |
| User ID = UID-usr2 | Output App: 0 |
| User Session Key = SKey-usr2-afc1 | |
| Data Output Socket = DSock-gt2-app2 | |

FIG.67

| |
|---|
| Packet Type = Accounting Notification |
| User ID = UID-usr1 |
| Usage = Usg-usr1-af1 |
| AF ID = AFID-af1 |
| AFC ID = AFCID-afc1 |

FIG.74

| |
|---|
| Packet Type = AFC Delete Request |
| User ID = UID-usr0 |
| AFC ID = AFCID-afc1 |
| Certificate = Cert-usr0-afc1 |

FIG.75

| |
|---|
| Packet Type = AFC Delete Response |
| Status = OK |

FIG.76

| |
|---|
| Packet Type = Connection Close Request |

FIG.77

| |
|---|
| Packet Type = Connection Close Response |
| Status = OK |

FIG.78

| |
|---|
| Packet Type = Accounting Notification |
| User ID = UID-usr0 |
| Usage = Delete AFC |
| AF ID = [null] |
| AFC ID = AFCID-afc1 |

FIG.80

| |
|---|
| Packet Type = AF Delete Request |
| User ID = UID-usr0 |
| AF ID = AFID-af1 |
| Certificate = Cert-usr0-af1 |

FIG.81

| |
|---|
| Packet Type = AF Delete Response |
| Status = OK |

FIG.82

| |
|---|
| Packet Type = Accounting Notification |
| User ID = UID-usr0 |
| Usage = Delete AF |
| AF ID = AFID-af1 |
| AFC ID = [null] |

FIG.84

| |
|---|
| Packet Type = Gate Delete Request |
| User ID = UID-usr0 |
| AF ID = AFID-gt1 |
| Certificate = Cert-usr0-gt1 |

FIG.85

| |
|---|
| Packet Type = Gate Delete Response |
| Status = OK |

| |
|---|
| Packet Type = Accounting Notification |
| User ID = UID-usr0 |
| Usage = Delete Gate |
| AF ID = AFID-gt1 |
| AFC ID = [null] |

COMMUNICATION DEVICE AND COMMUNICATION METHOD

CROSS-REFERENCE TO RELATED APPLICATIONS

The present application is based on PCT filing PCT/JP2020/027140, filed Jul. 10, 2020, which claims priority to JP 2019-134106, filed Jul. 19, 2019, the entire contents of each are incorporated herein by reference.

FIELD

The present disclosure relates to a communication device and a communication method.

BACKGROUND

As necessary from the viewpoint of a network operator or a service provider, a packet transferred in a network is transferred to a server device which is not included in an original packet transfer path so as to cause a service function (SF) operating on the server device to act on the packet, which is called service function chaining (SFC). Examples of the SF include a network address translation (NAT), a load balancer, and a web application firewall (WAF).

Non Patent Literature 1 describes an architecture of SFC. Further, Patent Literature 1 describes a method for autonomously and dispersedly performing failure detection and failure recovery of a device or a link in order to enhance availability of a virtualized network service function.

CITATION LIST

Patent Literature

Patent Literature 1: JP 2016-046736 A

Non Patent Literature

Non Patent Literature 1: J. Halpern and C. Pignataro. Service Function Chaining (SFC) Architecture, October 2015. RFC 7665.

SUMMARY

Technical Problem

However, in the SFC, the SF such as a WAF or a load balancer is prepared from the viewpoint of the network operator or the service provider. That is, the packet is to be subjected to the SFC is determined according to the intention of the network operator or the service provider.

In this regard, the present disclosure proposes a new and improved communication device and communication method which are highly convenient in a service for transferring a packet in a network and can cause one or a plurality of functions desired by a service user to act on a packet desired by the service user.

Solution to Problem

According to the present disclosure, a communication device which operates as an application node which executes one or a plurality of applications includes: a communication unit that executes communication with another logical node; and a control unit that controls communication by the communication unit. The another logical node is a node which is applied with application function chaining (AFC) in which, in transmission/reception of an application message with the application node as a transmission source or a transmission destination, one or a plurality of application functions act on the application message midway along a path of the transmission/reception. The control unit causes the communication unit to transmit, to the another logical node, a message according to a publishing/subscription model in order to transmit and receive the application message on which the one or the plurality of application functions act.

According to the present disclosure, a communication device which operates as a logical node includes: a communication unit that executes communication with an application node which executes one or a plurality of applications; and a control unit that applies application function chaining (AFC) in which one or a plurality of application functions act on an application message midway along a path of transmission/reception of the application message with the application node as a transmission source or a transmission destination. In a case where the application function acts on the application message with the application node as the transmission source or the transmission destination, the control unit causes the communication unit to receive all of one or a plurality of packets configuring the application message and then causes the application function to act in units of the one or the plurality of packets configuring the application message.

According to the present disclosure, a communication device which operates as a management node includes: a communication unit that executes communication with an accounting node in association with transmission and reception of an application message with an application node which executes one or a plurality of applications as a transmission source or a transmission destination; and a control unit that manages another logical node. The another logical node is a logical node which controls the communication by the communication unit and is applied with application function chaining (AFC) in which one or a plurality of application functions act on the application message midway along a path of transmission/reception of the application message with the application node as the transmission source or the transmission destination. In a case where the application function is caused to act on the application message with the application node as the transmission source or the transmission destination, the control unit generates a packet indicating a resource used to cause the application function to act and causes the communication unit to transmit the packet to the accounting node.

According to the present disclosure, a communication device which operates as an application node which executes one or a plurality of applications includes: a communication unit that executes communication with another management node; and a control unit that controls communication by the communication unit. The another management node is a node which manages application function chaining (AFC) in which one or a plurality of application functions act on an application message midway along a path of transmission/reception of the application message with an own application node or another application node as a transmission source or a transmission destination, and a logical node to which the AFC is applied. In case of a creator who has created, via the another management node, a node in which the own application node exists in the path of the transmission/reception and to which the AFC is applied, the control unit generates a packet which grants an authority to use the logical node applied with the AFC to the another application node serving as the transmission source or the transmission destination of the application message and causes the communication unit to transmit the packet.

According to the present disclosure, a communication method using a communication device which operates as an application node which executes one or a plurality of applications includes: executing communication with another logical node; and controlling the communication with the another logical node. The another logical node is a node which is applied with application function chaining (AFC) in which, in transmission/reception of an application message with the application node as a transmission source or a transmission destination, one or a plurality of application functions act on the application message midway along a path of the transmission/reception. The controlling means to transmit, to the another logical node, a message according to a publishing/subscription model in order to transmit and receive the application message on which the one or the plurality of application functions act.

According to the present disclosure, a communication method using a communication device which operates as a logical node includes: executing communication with an application node which executes one or a plurality of applications; and applying application function chaining (AFC) in which one or a plurality of application functions act on an application message midway along a path of transmission/reception of the application message with the application node as a transmission source or a transmission destination. The applying means to receive all of one or a plurality of packets configuring the application message and then cause the application function to act in units of the one or the plurality of packets configuring the application message in a case where the application function acts on the application message with the application node as the transmission source or the transmission destination.

According to the present disclosure, a communication method using a communication device which operates as a management node includes: executing communication with an accounting node in association with transmission and reception of an application message with an application node which executes one or a plurality of applications as a transmission source or a transmission destination; and managing another logical node. The another logical node is a logical node which controls the communication with the accounting node and is applied with application function chaining (AFC) in which one or a plurality of application functions act on the application message midway along a path of transmission/reception of the application message with the application node as the transmission source or the transmission destination. The managing means to generate a packet indicating a resource used to cause the application function to act and transmit the packet to the accounting node in a case where the application function is caused to act on the application message with the application node as the transmission source or the transmission destination.

According to the present disclosure, a communication method using a communication device which operates as an application node which executes one or a plurality of applications includes: executing communication with another management node; and controlling the communication with the another management node. The another management node is a node which manages application function chaining (AFC) in which one or a plurality of application functions act on an application message midway along a path of transmission/reception of the application message with an own application node or another application node as a transmission source or a transmission destination, and a logical node to which the AFC is applied. The controlling means to generate a packet which grants an authority to use the logical node applied with the AFC to the another application node serving as the transmission source or the transmission destination of the application message and transmit the packet in case of a creator who has created, via the another management node, a node in which the own application node exists in the path of the transmission/reception and to which the AFC is applied.

BRIEF DESCRIPTION OF DRAWINGS

FIG. 4 is a diagram illustrating an exemplary structure of a Gate Setup Request packet.

FIG. 5 is a diagram illustrating an exemplary structure of a Gate Setup Response packet.

FIG. 6 is a diagram illustrating an exemplary structure of a Gate AA Request packet.

FIG. 7 is a diagram illustrating an exemplary structure of a Gate AA Response packet.

FIG. 8 is a diagram illustrating an exemplary structure of a Data Port Notification packet.

FIG. 9 is a diagram illustrating an exemplary structure of an Accounting Notification packet (installation of a Gate Daemon1).

FIG. 11 is a diagram illustrating an exemplary structure of an Ingress Table held by the Gate Daemon1 after the installation of the Gate Daemon1.

FIG. 12 is a diagram illustrating an exemplary structure of an Egress Table held by the Gate Daemon2 after the installation of the Gate Daemon2.

FIG. 14 is a diagram illustrating an exemplary structure of an AF Setup Request packet.

FIG. 15 is a diagram illustrating an exemplary structure of an AF Setup Response packet.

FIG. 16 is a diagram illustrating an exemplary structure of an AF AA Request packet.

FIG. 17 is a diagram illustrating an exemplary structure of an AF AA Response packet.

FIG. 18 is a diagram illustrating an exemplary structure of an AF Invoke Request packet.

FIG. 19 is a diagram illustrating an exemplary structure of an AF Invoke Response packet.

FIG. 20 is a diagram illustrating an exemplary structure of an Accounting Notification packet (installation of an AF1).

FIG. 22 is a diagram illustrating an exemplary structure of an AFC Table held by an AFC Daemon1 after the installation of the AF1.

FIG. 23 is a diagram illustrating an exemplary structure of an AFC Table held by an AFC Daemon2 after the installation of the AF2.

FIG. 24 is a diagram illustrating an exemplary structure of an AFC Table held by an AFC Daemon3 after the installation of the AF 3.

FIG. 27 is a diagram illustrating an exemplary structure of an AFC Setup Request packet.

FIG. 28 is a diagram illustrating an exemplary structure of an AFC Setup Response packet.

FIG. 29 is a diagram illustrating an exemplary structure of a Conn Estab P Request packet.

FIG. 30 is a diagram illustrating an exemplary structure of a Conn Estab P Response packet.

FIG. 31 is a diagram illustrating an exemplary structure of a Conn Estab A Request packet.

FIG. 32 is a diagram illustrating an exemplary structure of a Conn Estab A Response packet.

FIG. 33 is a diagram illustrating an exemplary structure of a Set Condition Request packet.

FIG. 34 is a diagram illustrating an exemplary structure of a Set Condition Response packet.

FIG. 35 is a diagram illustrating an exemplary structure of a Set Session Key Request packet.

FIG. 36 is a diagram illustrating an exemplary structure of a Set Session Key Response packet.

FIG. 37 is a diagram illustrating an exemplary structure of an Accounting Notification packet (installation of AFC1).

FIG. 39 is a diagram illustrating an exemplary structure of an Ingress Table held by the Gate Daemon1 after the installation of the AFC.

FIG. 40 is a diagram illustrating an exemplary structure of an Egress Table held by the Gate Daemon2 after the installation of the AFC.

FIG. 41 is a diagram illustrating an exemplary structure of an AFC Table held by the AFC Daemon1 after the installation of the AFC.

FIG. 42 is a diagram illustrating an exemplary structure of an AFC Table held by the AFC Daemon2 after the installation of the AFC.

FIG. 43 is a diagram illustrating an exemplary structure of an AFC Table held by the AFC Daemon3 after the installation of the AFC.

FIG. 45 is a diagram illustrating an exemplary structure of an AFC Permission Request packet.

FIG. 46 is a diagram illustrating an exemplary structure of an AFC Permission Response packet.

FIG. 48 is a diagram illustrating an exemplary structure of a Get User Session Key Request packet.

FIG. 49 is a diagram illustrating an exemplary structure of a Get User Session Key Response packet.

FIG. 50 is a diagram illustrating an exemplary structure of an AFC AA Request packet.

FIG. 51 is a diagram illustrating an exemplary structure of an AFC AA Response packet.

FIG. 52 is a diagram illustrating an exemplary structure of a Set User Session Key Request packet.

FIG. 53 is a diagram illustrating an exemplary structure of a Set User Session Key Response packet.

FIG. 54 is a diagram illustrating an exemplary structure of an Ingress Table held by the Gate Daemon1 after Get User Session Key.

FIG. 55 is a diagram illustrating an exemplary structure of an Egress Table held by the Gate Daemon2 after Get User Session Key.

FIG. 57 is a diagram illustrating an exemplary structure of an Ingress Table held by the Gate Daemon1 after connection of an App 1.

FIG. 58 is a diagram illustrating an exemplary structure of an Egress Table held by the Gate Daemon2 after connection of an App2.

FIG. 67 is a diagram illustrating an exemplary structure of an Accounting Notification packet (data communication of the AF1).

FIG. 74 is a diagram illustrating an exemplary structure of an AFC Delete Request packet.

FIG. 75 is a diagram illustrating an exemplary structure of an AFC Delete Response packet.

FIG. 76 is a diagram illustrating an exemplary structure of a Connection Close Request packet.

FIG. 77 is a diagram illustrating an exemplary structure of a Connection Close Response packet.

FIG. 78 is a diagram illustrating an exemplary structure of an Accounting Notification packet (deletion of the AFC1).

FIG. 80 is a diagram illustrating an exemplary structure of an AF Delete Request packet.

FIG. 81 is a diagram illustrating an exemplary structure of an AF Delete Response packet.

FIG. 82 is a diagram illustrating an exemplary structure of an Accounting Notification packet (deletion of the AF1).

FIG. 84 is a diagram illustrating an exemplary structure of a Gate Delete Request packet.

FIG. 85 is a diagram illustrating an exemplary structure of a Gate Delete Response packet.

DESCRIPTION OF EMBODIMENTS

Figure 1:
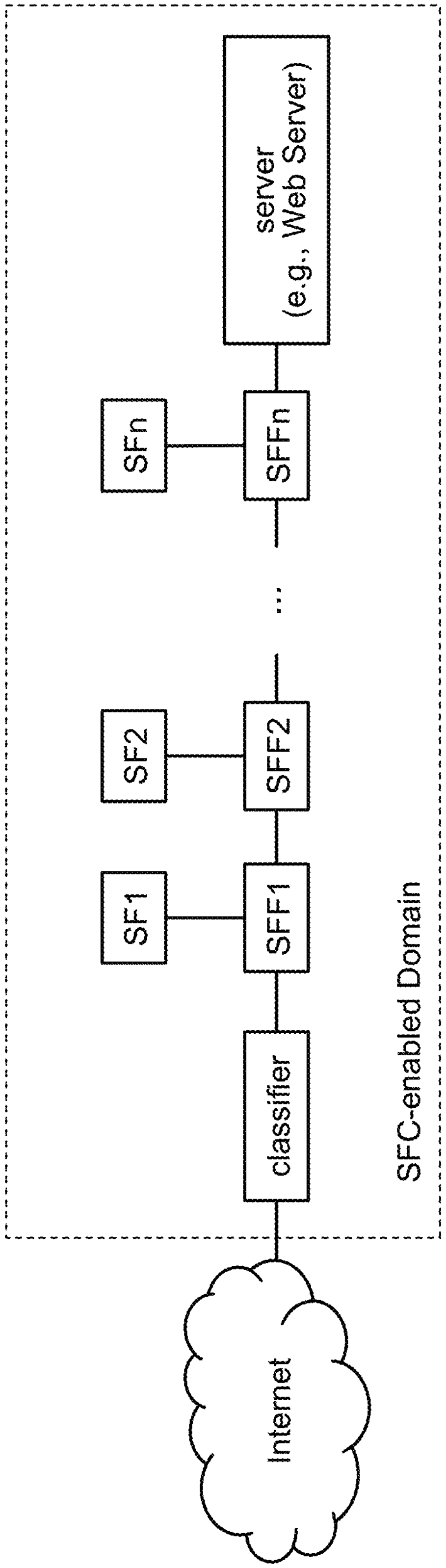
FIG. 1 is an explanatory diagram illustrating an exemplary architecture of SFC disclosed in Non Patent Literature 1.

Hereinafter, preferred embodiments of the present disclosure will be described in detail with reference to the accompanying drawings. Incidentally, in this specification and drawings, constituent elements having substantially the same functional configuration are denoted by the same reference numerals, and redundant description is omitted.

Incidentally, the description will be made in the following order.

1. Embodiment of the present disclosure
1.1. Exemplary architecture of SFC
1.2. Specific description of AFC
1.3. Functional configuration example of communication device
2. Conclusion

1. Embodiment of the Present Disclosure

1.1. Exemplary Architecture of SFC

Before describing an embodiment of the present disclosure in detail, first, an exemplary architecture of SFC will be described. FIG. 1 is an explanatory diagram illustrating an exemplary architecture of SFC disclosed in Non Patent Literature 1.

In the SFC architecture as illustrated in FIG. 1, a range to which SFC is applied is referred to as an SFC-enabled Domain. In the SFC-enabled Domain, there are a classifier, a service function forwarder (SFF), a service function (SF), a Server (for example, a Web Server), and the like.

In FIG. 1, a case where a Web Server is accessed from the Internet will be considered. A packet which enters the SFC-enabled Domain from the Internet first arrives at the classifier. The classifier determines which SF is to be applied to the packet from the header of the packet, inserts such information into the packet as a network service header (NSH), and then relays the packet. For example, it is assumed that only an SF1 is applied to this packet.

When receiving the packet, an SFF1 learns from contents of the NSH that the SF1 is applied to the packet, and transfers the packet to the SF1. The SF1 processes the packet and returns the packet to the SFF1. Further, the SFF1 transfers the packet to an SFF2. In this example, only the SF1 is applied to the packet, so that the SFF2 to SFFn simply relay the packet, and finally the packet reaches the Web Server.

In the SFC having such an architecture, the SF such as a WAF or a load balancer is prepared from the viewpoint of a network operator or a service provider. That is, the packet is to be subjected to the SFC is determined according to the intention of the network operator or the service provider.

On the other hand, the description will be given below about an architecture which is highly convenient in a service for transferring a packet in a network and causes one or a plurality of functions desired by a service user to act on a packet desired by the service user. In this embodiment, such an architecture is referred to as an application function chaining (AFC), and a function operated in the AFC architecture is referred to as an application function (AF).

1.2. Specific Description of AFC (AFC for Edge/Fog/Cloud Architecture)

In the AFC, a node (corresponding to an "AF Node" to be described later) at which the AF is installed can be selected according to characteristics of the AF and performance required by the user. For example, a server (Edge Server) installed around the network does not have a high computing capability, but has a small communication delay from the device of the user. Conversely, a server (Cloud Server) installed in a data center has a high computing capability, but has a large communication delay from the device of the user. Further, a server (Fog Server) installed inside the network has an intermediate property between the Edge Server and the Cloud Server in terms of the computing capability and the communication delay from the device of the user. In the AFC, these servers can be appropriately selected as AF Nodes. Further, in the SFC, as illustrated in FIG. 1, a communication path can be realized only in a linear shape, but in the AFC, in addition to the linear shape, a shape having branching and merging can also be realized.

Figure 2:
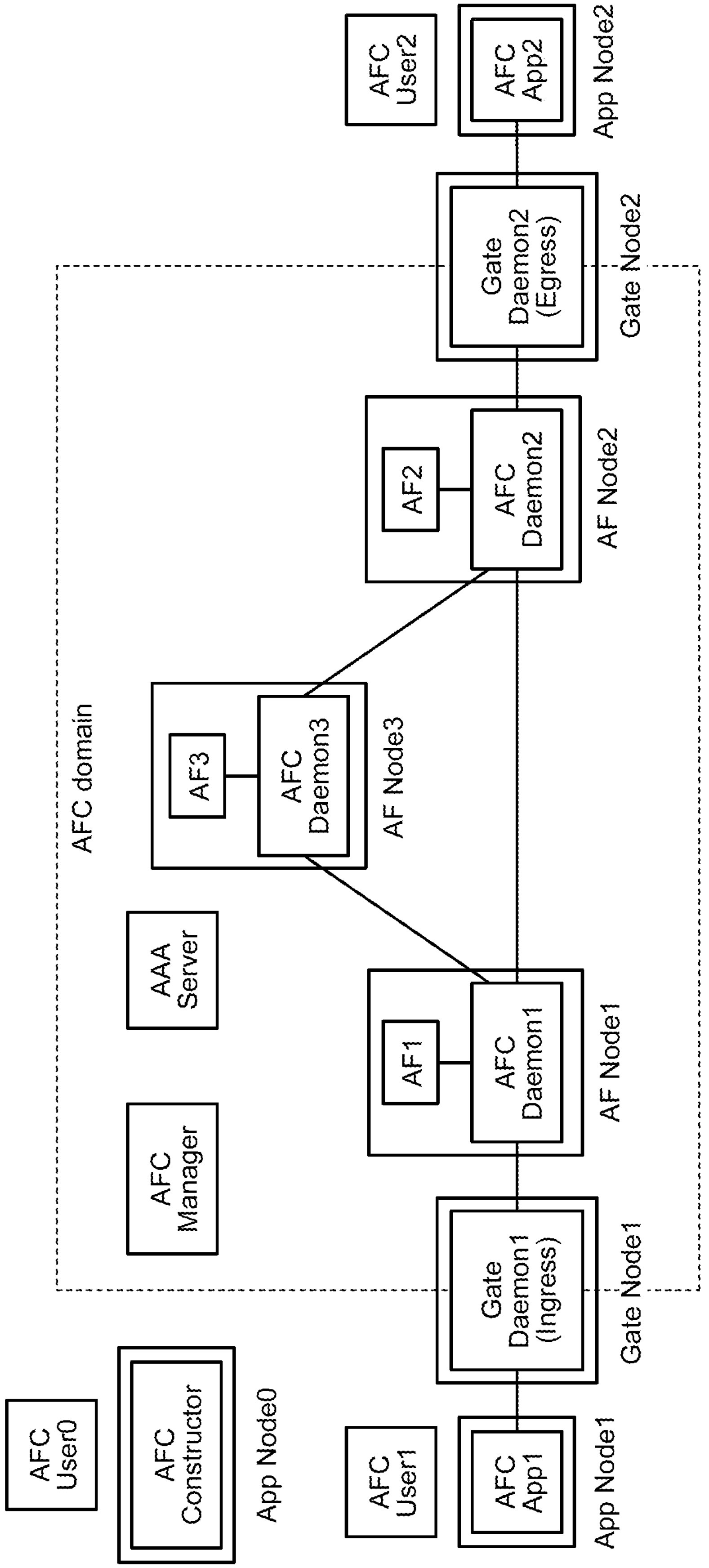
FIG. 2 is an explanatory diagram illustrating an AFC architecture proposed in an embodiment of the present disclosure.

A more specific description will be given below. FIG. 2 is an explanatory diagram illustrating an AFC architecture proposed in the embodiment of the present disclosure.

First, an AFC User is a user of the AFC and executes the AFC App which is an application using the AFC. A node on which the AFC App operates is referred to as an App Node. Further, an AFC Constructor is a type of the AFC App, and installs or deletes the AFC. In FIG. 2, it is assumed that an AFC User0 executes the AFC Constructor, an AFC User1 executes an AFC App1, and an AFC User2 executes an AFC App2. Incidentally, the AFC App may also serve as the AFC Constructor.

In addition, an area to which the AFC is applied is referred to as an AFC domain. The AFC domain includes an AFC Manager and an AAA (Authentication, Authorization, and Accounting) Server. The AFC Manager manages installation and deletion of AF, AFC, and the like. The AAA Server performs authentication, authorization, and accounting for the AFC User. The authentication is a process of verifying the authenticity of the AFC User. The authorization is a process of verifying whether the AFC User has authority to perform specific processing. The accounting is a process of recording how much the AFC User has consumed the calculation resource.

Gate Nodes are arranged at boundaries of the AFC domain. In the Gate Node, a process called a Gate Daemon-p is operating. Incidentally, in FIG. 2, the Gate Daemon-p is omitted. The Gate Daemon-p generates a Gate Daemon, which is a child process, for each AFC, and the processing related to the AFC is performed by the Gate Daemon. The Gate Daemon that receives an application message from the AFC App is also referred to as an Ingress. On the other hand, the Gate Daemon that transmits an application message to the AFC App is also referred to as an Egress. Both Ingress and Egress for one AFC may operate on one Gate Node. FIG. 2 is an example in which a Gate Daemon1 operates as the Ingress and a Gate Daemon2 operates as the Egress.

In addition, a node at which the AF operates in the AFC domain is referred to as an AF Node. In the AF Node, a process called an AFC Daemon-p operates. Incidentally, in FIG. 2, the AFC Daemon-p is omitted. When the AF is activated, the AFC Daemon-p creates an AFC Daemon which is a child process, and the processing related to the AFC thereafter is performed by the AFC Daemon. The AFC Daemon can switch the AFC Daemon to transmit the next application message according to the execution result of the AF. In FIG. 2, the AFC Daemon1 can switch the transmission destination of the application message to the AFC Daemon2 or the AFC Daemon3 according to the execution result of the AF1.

In addition, the AFC use by the AFC App is based on a Pub/Sub (Publish/Subscribe) system (so-called publishing/subscription model). The AFC App on the transmission side designates the AFC to be used and transmits the application message to the Ingress by a Pub packet. On the other hand, the AFC App on the reception side designates the AFC to be used and waits for the arrival of the application message from the Egress by the Sub packet. FIG. 2 illustrates an example in which the AFC App1 is an AFC App on the transmission side and the AFC App2 is an AFC App on the reception side. One application may serve as both the transmission side and the reception side.

Incidentally, it is assumed that a control transport layer security (TLS) connection is always established between the AFC Manager and the AAA Server. A control TLS connection between the AFC Constructor and the AFC Manager is established when needed. When the AFC is installed, a data TLS connection is established between the Ingress and the AFC Daemon, two AFC Daemons, and the AFC Daemon and the Egress which configure the AFC. Further, while the AFC exists, a control TLS connection is established between the AFC Manager and each of the Ingress, the AFC Daemon, and the Egress which configure the AFC. As described above, the control packet and the data packet related to the AFC are transmitted using the TLS connection, and thus eavesdropping and falsification of communication data do not occur.

The present AFC architecture may be applied to various network configurations. For example, when the present AFC architecture is applied to a telecommunication network (e.g., Wideband Code Division Multiple Access (W-CDMA), Long Term Evolution (LTE), New Radio (NR)), the APP Node may be user equipment (UE). The AF node may be the same as the Application Function Node defined in 3GPP. In addition, the AFC domain may be realized by a network slice virtually constructed on a core network (e.g., 5GC, 5GS) of a telecommunication network. In this case, each node virtually constructed in the AFC domain (e.g., AF Node, Gate Node) may be constructed by a network slice instance configuring a network slice.

(Gate Daemon Installation Procedure)

Figure 3:
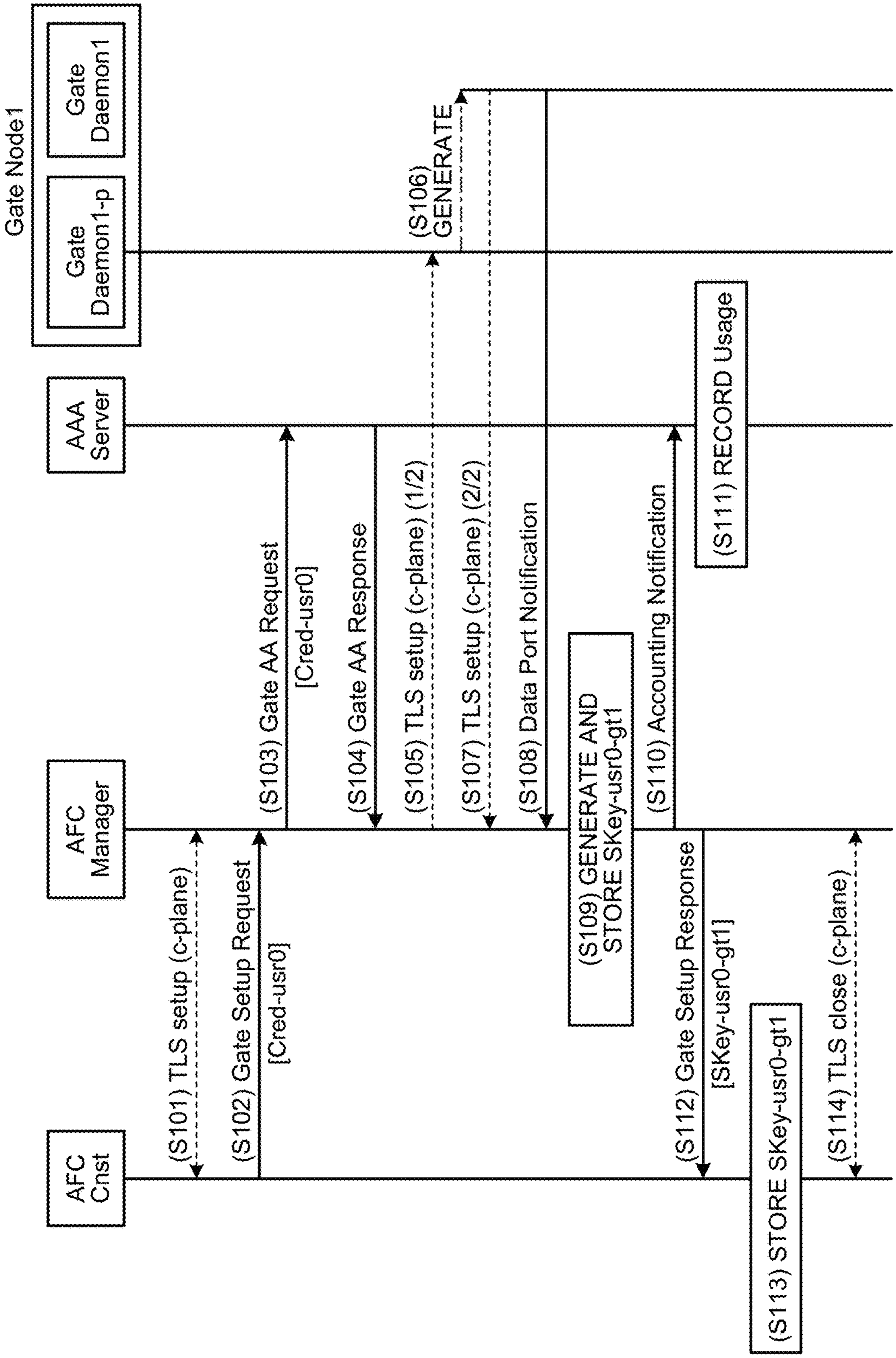
FIG. 3 is a diagram illustrating a processing procedure of installation processing of a Gate Daemon.

Next, a procedure in which the AFC Constructor installs the Gate Daemon will be described with reference to FIG. 3. FIG. 3 is a diagram illustrating a processing procedure of Gate Daemon installation processing. Incidentally, FIG. 3 illustrates a procedure in which the AFC User0 executes the AFC Constructor, and the AFC Constructor installs a Gate Daemon1 as the Ingress on the Gate Node1. Here, the identifier of the AFC User0 is set to UID-usr0. Further, the authentication information of the AFC User 0 is set to Cred-usr0. The content of Cred-usr0 may be a password of the AFC User0 or the like. In addition, the IP address of the Gate Node1 is set to IP-gtn1.

First, the AFC Constructor establishes a control TLS connection with the AFC Manager (step S101). Here, the socket for the control TLS connection in the AFC Manager is set to CSock-mgr-gt1.

Then, the AFC Constructor transmits the Gate Setup Request packet illustrated in FIG. 4 to the AFC Manager (step S102). The values of the fields are as follows. The value of the Packet Type field is "Gate Setup Request". The value of the Gate Type field is "Ingress". The value of the User ID field is UID-usr0. The value of the Credential field is Cred-usr0. The value of the IP Address field is IP-gtn1.

When receiving the Gate Setup Request packet, the AFC Manager transmits a Gate AA Request packet illustrated in FIG. 6 to the AAA Server (step S103). The values of the fields are as follows. The value of the Packet Type field is "Gate AA Request". The value of the User ID field is UID-usr0. The value of the Credential field is Cred-usr0. The value of the IP Address field is IP-gtn1.

When receiving the Gate AA Request packet, the AAA Server authenticates the AFC User0 based on the values of the User ID field and the Credential field. Further, the AAA Server verifies whether the AFC User0 has authority to install a Gate Daemon in the Gate Node1. Subsequently, the AAA Server transmits the Gate AA Response packet illustrated in FIG. 7 to the AFC Manager (step S104). The values of the fields are as follows. The value of the Packet Type field is "Gate AA Response". The value of the Status field is "OK" indicating that the processing is normal.

Then, the AFC Manager starts establishing a control TLS connection with the Gate Daemon1-p (step S105), and the Gate Daemon1-p generates the Gate Daemon1 as a child process (step S106).

The generated Gate Daemon1 continues the control TLS connection establishment processing, and as a result, the control TLS connection is established between the AFC Manager and the Gate Daemon1 (step S107). Here, the socket for the control TLS connection in the AFC Manager is set to CSock-mgr-gt1.

Then, the Gate Daemon1 allocates DPt-gt1-app as a port for the data TLS connection established with the AFC App on the transmission side, and transmits the Data Port Notification packet illustrated in FIG. 8 to the AFC Manager (step S108). The values of the fields are as follows. The value of the Packet Type field is "Data Port Notification". The value of the Data Port field is DPt-gt1-app.

Then, when receiving the Gate AA Response packet, the AFC Manager generates and stores the SKey-usr0-gt1 as a Gate Session Key (step S109), and assigns AFID-gt1 as an identifier to the Gate Daemon1. Subsequently, the AFC Manager transmits the Accounting Notification packet illustrated in FIG. 9 to the AAA Server (step S110). The values of the fields are as follows. The value of the Packet Type field is "Accounting Notification". The value of the User ID field is UID-usr0. The value of the Usage field indicates information on a resource used for AF. In this embodiment, the value of the Usage field indicates the use of the resource, and in this example, "Gate Setup" indicating that the Gate Daemon is installed is set. The value of the AF ID field is AFID-gt1. The value of the AFC ID field is [null].

When receiving the Accounting Notification packet, the AAA Server records the value of the Usage field (step S111). The recorded value of the Usage field may be used for accounting (charging) of the AFC App by the AAA Server.

Then, the AFC Manager transmits the Gate Setup Response packet illustrated in FIG. 5 to the AFC Constructor (step S112). The values of the fields are as follows. The value of the Type field is “Gate Setup Response”. The value of the Status field is “OK” indicating that the processing is normal. The value of the AF ID field is AFID-gt1. The value of the Data Port field is DPt-gt1-app. The value of the Gate Session Key field is SKey-usr0-gt1.

Then, when receiving the Gate Setup Response packet, the AFC Constructor stores the SKey-usr0-gt1 (step S113), and releases the control TLS connection with the AFC Manager (step S114).

As a result of the above processing, SKey-usr0-gt1, which is the Gate Session Key, is shared between the AFC Constructor and the AFC Manager. In addition, the control TLS connection is maintained between the AFC Manager and the Gate Daemon1.

Next, in a similar procedure, the AFC Constructor installs the Gate Daemon2 as the Egress on the Gate Node2. The AFC Manager assigns AFID-gt2 as an identifier to the Gate Daemon2. At that time, the value of the Gate Type field of the Gate Setup Request packet is “Egress”.

As a result, the Gate Daemon2 allocates DPt-gt2-app as a port for the data TLS connection to be established with the AFC App on the reception side, and SKey-usr0-gt2 is shared as the Gate Session Key between the AFC Manager and the Gate Daemon2. In addition, the control TLS connection is maintained between the AFC Manager and the Gate Daemon2. Here, the socket for the control TLS connection in the AFC Manager is set to CSock-mgr-gt2.

Figure 10:
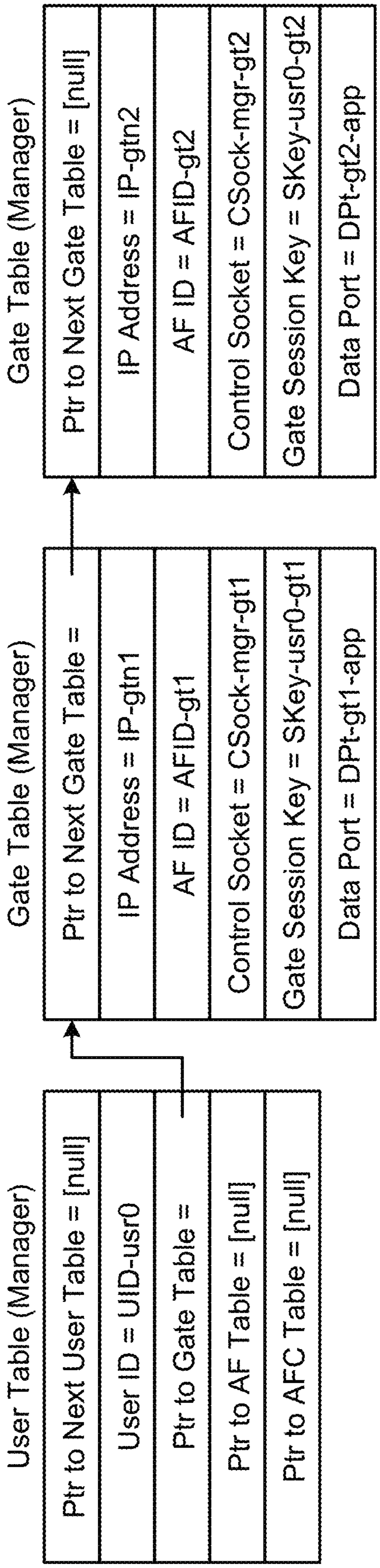
FIG. 10 is a diagram illustrating an exemplary structure of each table held by an AFC Manager after the installation of the Gate Daemon1 and a Gate Daemon2.

As a result of the above processing, the AFC Manager holds each table illustrated in FIG. 10. Specifically, the AFC Manager holds a User Table for each AFC User. The values of the fields of the User Table are as follows. The value of the Ptr to Next User Table field is a pointer pointing to another User Table. At this point, the value is [null]. The value of the User ID field is UID-usr0. The value of the Ptr to Gate Table field is a pointer pointing to a Gate Table. The value of the Ptr to AF Table field is a pointer pointing to an AF Table. At this point, the value is [null]. The value of the Ptr to AFC Table field is a pointer pointing to an AFC Table. At this point, the value is [null].

In addition, the AFC Manager holds a Gate Table for each Gate Daemon. A first Gate Table is for the Gate Daemon1, and the values of the fields are as follows. The value of the Ptr to Next Gate Table field is a pointer pointing to a second Gate Table. The value of the IP Address field is IP-gtn1. The value of the AF ID field is AFID-gt1. The value of the Control Socket field is CSock-mgr-gt1. The value of the Gate Session Key field is SKey-usr0-gt1. The value of the Data Port field is DPt-gt1-app.

The second Gate Table is for the Gate Daemon2, and the values of the fields are as follows. The value of the Ptr to Next Gate Table field is [null]. The value of the IP Address field is IP-gtn2. The value of the AF ID field is AFID-gt2. The value of the Control Socket field is CSock-mgr-gt2. The value of the Gate Session Key field is SKey-usr0-gt2. The value of the Data Port field is DPt-gt2-app.

In addition, after the Gate Daemon1 is installed, the Gate Daemon1 holds an Ingress Table illustrated in FIG. 11. The values of the fields in the Ingress Table are as follows. The value of the AFC Session Key field is undefined ([undef]). The value of the App Data Port field is DPt-gt1-app. The value of the No of Input Apps field indicates the number of applications establishing a data TLS connection with the Gate Daemon1. At this point, the value is 0. Following this field, Data Input Socket fields are provided as many as the number indicated by the value of the No of Input Apps field, but at this point, there is no Data Input Socket field yet. The value of the Data Output Socket field indicates a socket that next transmits the application message. At this point, the value is undefined ([undef]).

In addition, after the Gate Daemon2 is installed, the Gate Daemon2 holds the Egress Table illustrated in FIG. 12. The values of the fields in the Egress Table are as follows. The value of the AFC Session Key field is undefined ([undef]). The value of the App Data Port field is DPt-gt2-app. The value of the No of Data Input Sockets field indicates the number of sockets for receiving the application message from the AFC Daemon. At this point, the value is 0. Following this field, the Data Input Socket fields are provided as many as the number indicated by the value of the No of Data Input Sockets field, but at this point, there is no Data Input Socket field yet. The value of the No of Output Apps field indicates the number of applications establishing a data TLS connection with the Gate Daemon2. At this point, the value is 0. Following this field, the Data Output Socket fields are provided as many as the number indicated by the value of the No of Output Apps field, but at this point, there is no Data Output Socket field yet.

(AF Installation Procedure)

Figure 13:
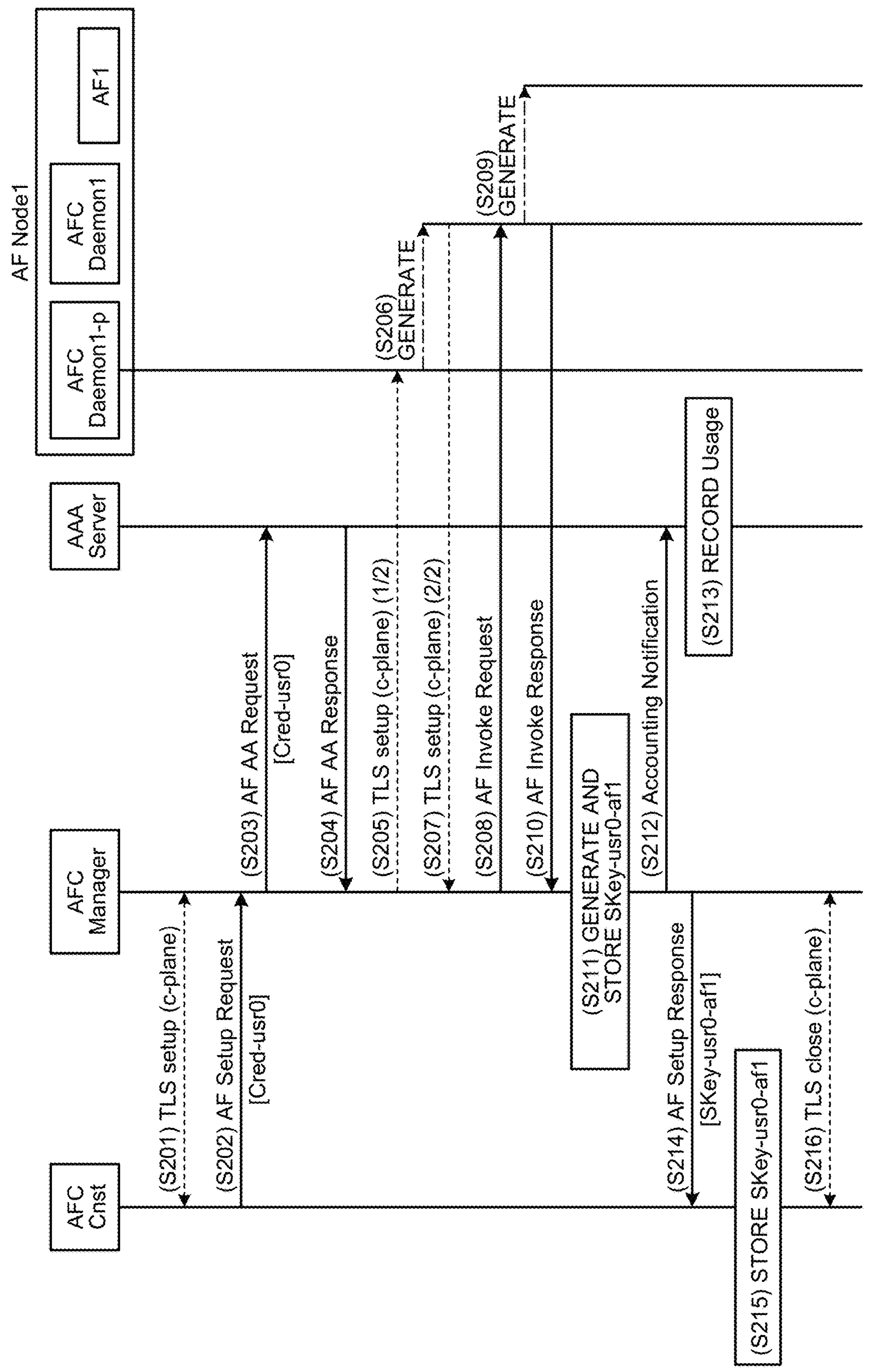
FIG. 13 is a diagram illustrating a processing procedure of AF installation processing.

Next, a procedure in which the AFC Constructor installs the AF will be described with reference to FIG. 13. FIG. 13 is a diagram illustrating a processing procedure of AF installation processing. Incidentally, FIG. 13 illustrates a procedure in which the AFC Constructor activated by the AFC User0 installs the AF1 on the AF Node1. Here, the IP address of the AF Node1 is set to IP-afn1. Further, the executable file name of the AF1 is set to AFName-af1. Further, a parameter for activating the AF1 is set to AFParam-af1.

First, the AFC Constructor establishes a control TLS connection with the AFC Manager (step S201).

Then, the AFC User transmits the AF Setup Request packet illustrated in FIG. 14 to the AFC Manager (step S202). The values of the fields are as follows. The value of the Packet Type field is “AF Setup Request”. The value of the User ID field is UID-usr0. The value of the Credential field is Cred-usr0. The value of the IP Address field is IP-afn1. The value of the AF Name field is AFName-af1. The value of the AF Parameter field is AFPram-af1.

Then, when receiving the AF Setup Request packet, the AFC Manager transmits the AF AA Request packet illustrated in FIG. 16 to the AAA Server (step S203). The values of the fields are as follows. The value of the Packet Type field is “AF AA Request”. The value of the User ID field is UID-usr0. The value of the Credential field is Cred-usr0. The value of the IP Address field is IP-afn1. The value of the AF Name field is AFName-af1.

Then, when receiving the AF AA Request packet, the AAA Server authenticates the AFC User0 on the basis of the values of the User ID field and the Credential field, and verifies whether the AFC User0 has authority to activate the AF1 in the AF Node1. Subsequently, the AAA Server transmits the AF AA Response packet illustrated in FIG. 17 to the AFC Manager (step S204). The values of the fields are as follows. The value of the Packet Type field is “AF AA Response”. The value of the Status field is “OK” indicating that the authentication and authorization confirmation is normal.

Then, the AFC Manager starts establishing the control TLS connection with the AFC Daemon1-p (step S205), and the AFC Daemon1-p generates the AFC Daemon1 as a child process (step S206).

The generated AFC Daemon1 continues the control TLS connection establishment processing, and as a result, the control TLS connection is established between the AFC Manager and the AFC Daemon1 (step S207). Here, the socket for the control TLS connection in the AFC Manager is set to CSock-mgr-af1. In addition, the socket for the control TLS connection in the AFC Daemon1 is set to CSock-af1-mgr.

Then, the AFC Manager transmits the AF Invoke Request packet illustrated in FIG. 18 to the AFC Daemon1 (step S208). The values of the fields are as follows. The value of the Packet Type field is "AF Invoke Request". The value of the User ID field is UID-usr0. The value of the AF Name field is AFName-af1. The value of the AF Parameter field is AFPram-af1.

When receiving the AF Invoke Request packet, the AFC Daemon1 designates AFParam-af1 and activates the AF1 (step S209). At that time, three ports of Pt-af1-input which is a data input port to the AF1, Pt-af1-output which is a data output port from the AF1, and Pt-af1-stat which is a state output port from the AF1 are generated.

Then, the AFC Daemon1 transmits the AF Invoke Response packet illustrated in FIG. 19 to the AFC Manager (step S210). The values of the fields are as follows. The value of the Packet Type field is "AF Invoke Response". The value of the Status field is "OK" indicating that the processing is normal.

When receiving the AF Invoke Response packet, the AFC Manager assigns AFID-af1 as an identifier to the AF1. Further, SKey-usr0-af1 is generated and stored as the AF Session Key (step S211).

Then, the AFC Manager transmits the Accounting Notification packet illustrated in FIG. 20 to the AAA Server (step S212). The values of the fields are as follows. The value of the Packet Type field is "Accounting Notification". The value of the AFC ID field is [null]. The value of the User ID field is UID-usr0. The value of the IP Address field is IP-afn1. The value of the AF ID field is AFID-af1. The value of the Usage field is "AF Setup" indicating that the AF1 is installed.

When receiving the Accounting Notification packet, the AAA Server records the value of the Usage field (step S213).

Then, the AFC Manager transmits the AF Setup Response packet illustrated in FIG. 15 to the AFC Constructor (step S214). The values of the fields are as follows. The value of the Packet Type field is "AF Setup Response". The value of the Status field is "OK" indicating that the processing is normal. The value of the AF ID field is AFID-af1. The value of the AF Session Key field is SKey-usr0-af1.

When receiving the AF Setup Response packet, the AFC Constructor stores SKey-usr0-af1 (step S215), and releases the control TLS connection with the AFC Manager (step S216).

As a result of the above processing, SKey-usr0-aft, which is the AF Session Key, is shared between the AFC Constructor and the AFC Manager. In addition, the control TLS connection is maintained between the AFC Manager and the AFC Daemon1.

Next, in a similar procedure, the AFC Constructor installs the AFC Daemon2 on the AF Node2 and installs the AFC Daemon3 on the AF Node3. SKey-usr0-af2 is shared as an AF Session Key between the AFC Manager and the AFC Daemon2, and SKey-usr0-af3 is shared as an AF Session Key between the AFC Manager and the AFC Daemon3.

In addition, the control TLS connection is maintained between the AFC Manager and the AFC Daemon2. Here, the socket for the control TLS connection in the AFC Manager is set to CSock-mgr-af2. In addition, the socket for the control TLS connection in the AFC Daemon2 is set to CSock-af2-mgr.

In addition, the control TLS connection is maintained between the AFC Manager and the AFC Daemon3. Here, the socket for the control TLS connection in the AFC Manager is set to CSock-mgr-af3. In addition, the socket for the control TLS connection in the AFC Daemon3 is set to CSock-af3-mgr.

Figure 21:
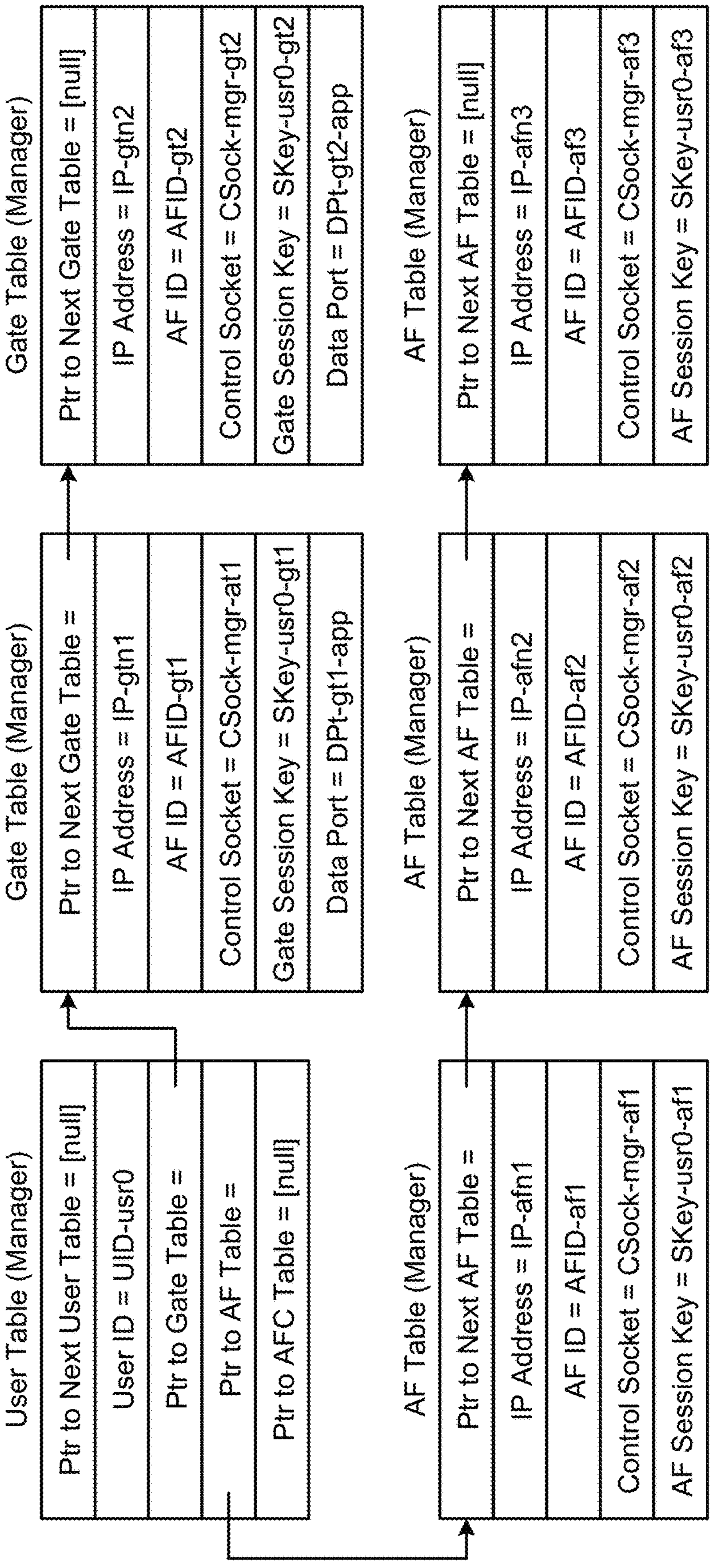
FIG. 21 is a diagram illustrating an exemplary structure of each table held by the AFC Manager after the installation of the AF1 to the AF3.

As a result of installing the AF1 to the AF3, the AFC Manager holds each table illustrated in FIG. 21. The value of the Ptr to AF Table field of the User Table illustrated in FIG. 10 is a pointer pointing to the AF Table, and three AF Tables are added. A first AF Table relates to the AF1. The values of the fields are as follows. The value of the Ptr to Next AF Table field is a pointer to a second AF Table. The value of the IP Address field is IP-afn1. The value of the AF ID field is AFID-af1. The value of the Control Socket field is CSock-mgr-af1. The value of the AF Session Key field is SKey-usr0-af1.

The second AF Table relates to the AF2, and a third AF Table relates to the AF3. The values of the fields are similar for the second and third AF Tables, but the value of the Ptr to Next AF Table field of the third AF Table is [null].

In addition, after the AF1 is installed, the AFC Daemon1 holds the AFC Table illustrated in FIG. 22. The values of the fields are as follows. The value of the Control Socket field is CSock-af1-mgr. The value of the AF Data Input Port field is Pt-af1-input. The value of the AF Data Output Port field is Pt-af1-output. The value of the AF Status Port field is Pt-af1-stat.

The value of the No of Data Input Sockets field indicates the number of sockets for data TLS connections established with the Gate Daemon and other AFC Daemons to receive application messages. The value at this point is 0. When the value of this field is 1 or more, this field is followed by Data Input Socket fields as many as the number indicated by the value of this field. At this point, there is no Data Input Socket field.

The value of the No of Data Output Sockets field indicates the number of sockets for the data TLS connection established for transmitting the application message. The value at this point is 0. When the value of this field is 1 or more, this field is followed by Data Output Socket fields as many as the number indicated by the value of this field. At this point, there is no Data Output Socket field.

An Operator field indicates an operator to be applied to the return value of the AF1 obtained from the AF Status Port. The value at this point is undefined ([undef]). The Operand field is an operand for the operator indicated by the Operator field. The value at this point is undefined ([undef]).

The value of the True Data Output Socket Index field indicates an index of a Data Output Socket which transmits the application message when a value (determination value) obtained by applying the operator indicated by the Operator field and the operand indicated by the Operand field to the return value of the AF1 is true. The value at this point is undefined ([undef]). The value of the False Data Output Socket Index field indicates an index of a Data Output Socket which transmits the application message when the determination value is false. The value at this point is undefined ([undef]).

In addition, after the AF2 is installed, the AFC Daemon2 holds the AFC Table illustrated in FIG. 23. In addition, after the AF3 is installed, the AFC Daemon3 holds the AFC Table illustrated in FIG. 24. The values of the respective fields of the AFC Table held by the AFC Daemon2 and the AFC Daemon3 are similar to the values of the respective fields of the AFC Table held by the AFC Daemon1.

(AFC Installation Procedure)

Figure 25:
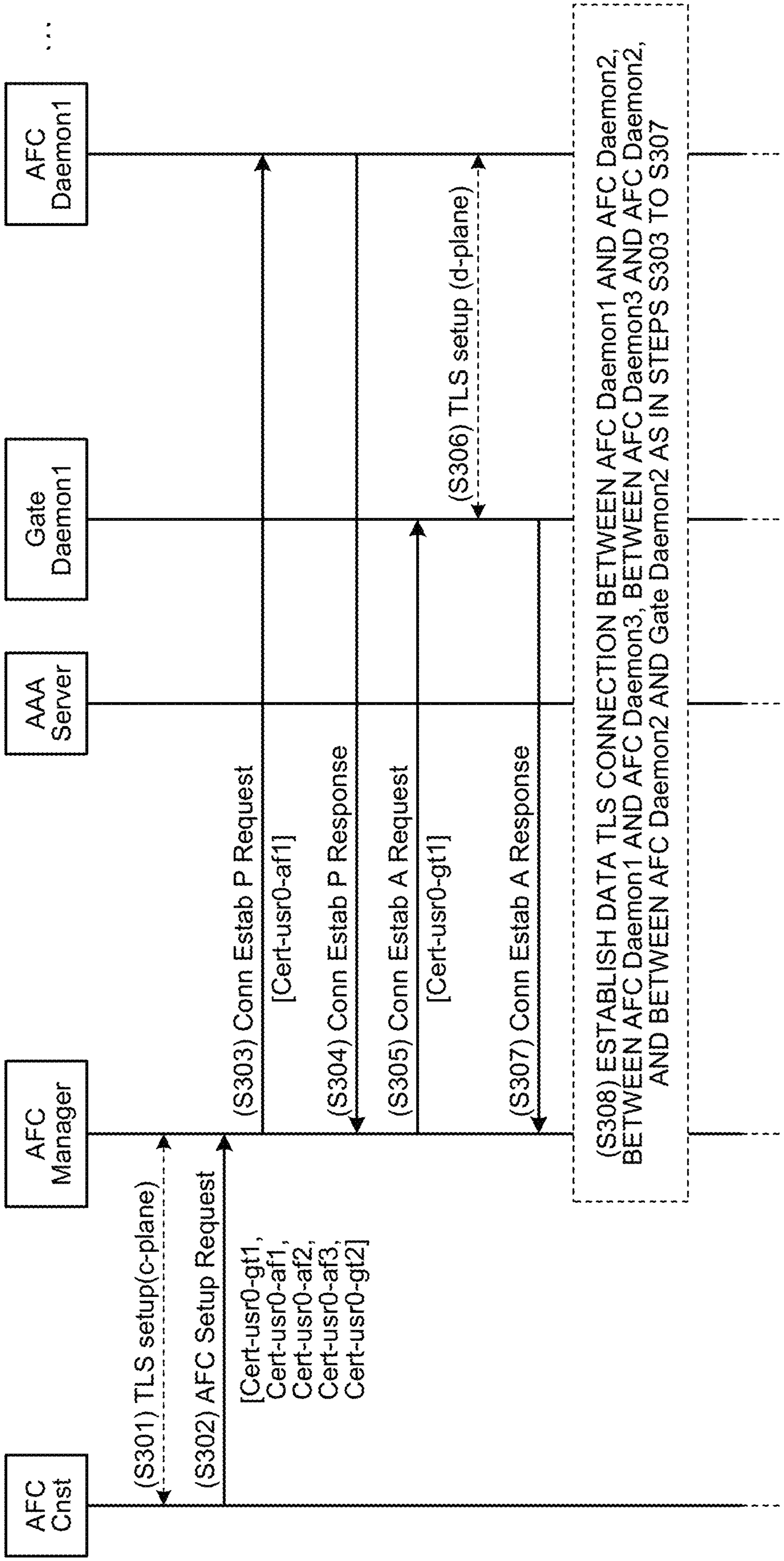
FIG. 25 is a diagram (part 1) illustrating a processing procedure of AFC installation processing.
Figure 26:
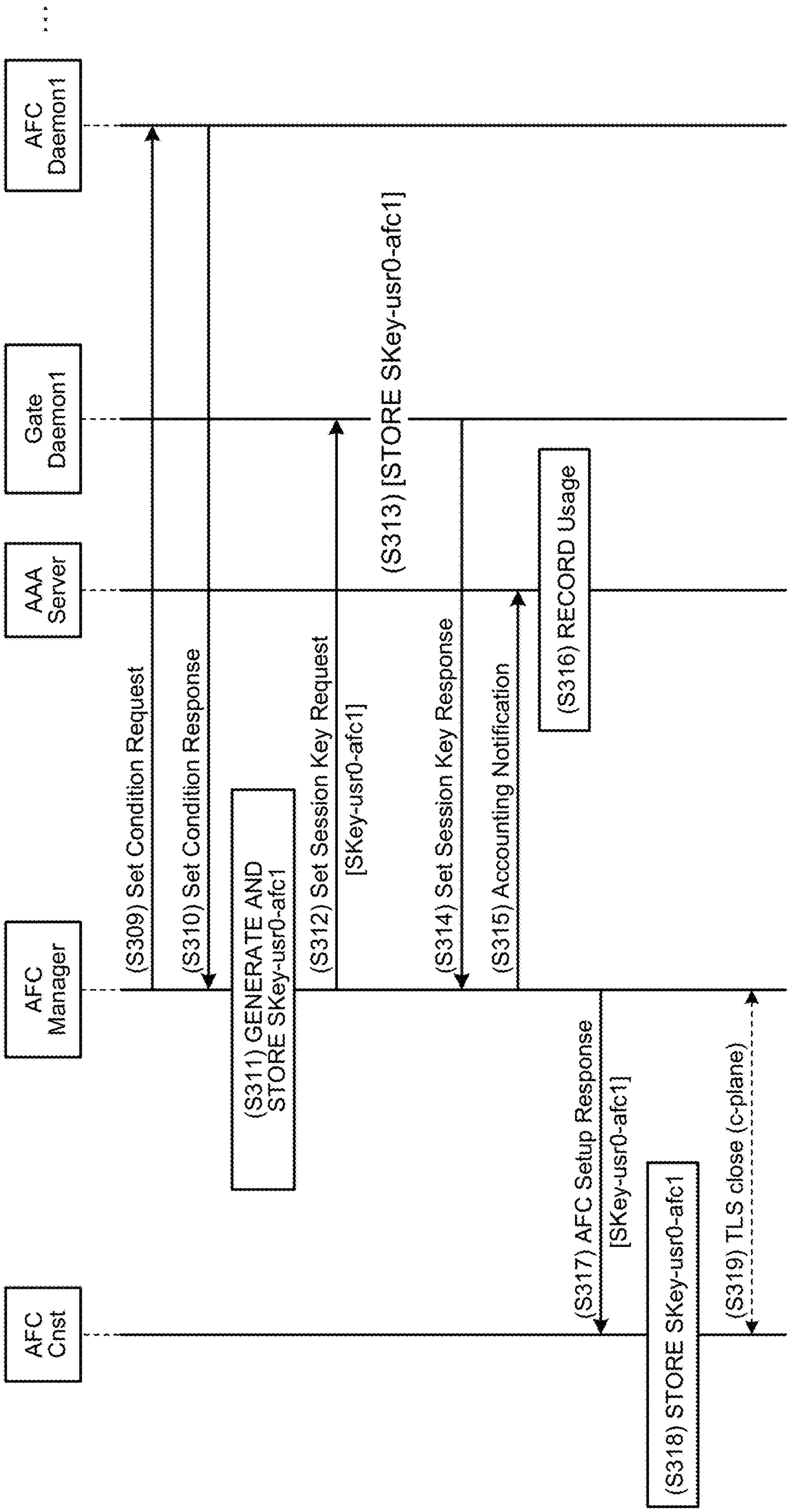
FIG. 26 is a diagram (part 2) illustrating the processing procedure of the AFC installation processing.

Next, a procedure in which the AFC Constructor installs the AFC illustrated in FIG. 2 will be described with reference to FIGS. 25 and 26. FIG. 25 is a diagram (part 1) illustrating a processing procedure of AFC installation processing. In addition, FIG. 26 is a diagram (part 2) illustrating a processing procedure of the AFC installation processing. Incidentally, the AFC installed in the processing procedure illustrated in FIGS. 25 and 26 is referred to as an AFC1.

First, the AFC Constructor establishes a control TLS connection with the AFC Manager (step S301).

The AFC Constructor transmits the AFC Setup Request packet illustrated in FIG. 27 to the AFC Manager (step S302). The values of the fields are as follows. The value of the Packet Type field is "AFC Setup Request". The value of the User ID field is UID-usr0. The following two fields relate to the Gate Daemon1 to be an Ingress. The value of the AF ID field is AFID-gt1. The value of the Certificate field is Cert-usr0-gt1. As a method of creating Cert-usr0-gt1, it is conceivable to use a result obtained by applying to a hash function a value obtained by adding SKey-usr0-gt1 to this packet.

The value of the No of AFs field indicates the number of the AFs configuring the AFC. In this example, the value is 3. The following two fields relate to the AF1. The value of the AF ID field is AFID-af1. The value of the Certificate field is Cert-usr0-af1. As a method of creating Cert-usr0-af1, it is conceivable to use a result obtained by applying to a hash function a value obtained by adding SKey-usr0-af1 to this packet. The following two fields relate to the AF2, and the following two fields relate to the AF3.

The value of the No of Egresses field indicates the number of the Gate Daemons to be an Egress. In this example, the value is 1. The following two fields relate to the Gate Daemon2 to be an Egress. The value of the AF ID field is AFID-gt2. The value of the Certificate field is Cert-usr0-gt2. As a method of creating Cert-usr0-gt2, it is conceivable to use a result obtained by applying to a hash function a value obtained by adding SKey-usr0-gt2 to this packet.

The value of the No of Connections field indicates the number of data TLS connections configuring the AFC. In this example, the value is 5 (between the Gate Daemon1 and the AFC Daemon1, between the AFC Daemon1 and the AFC Daemon2, between the AFC Daemon1 and the AFC Daemon3, between the AFC Daemon3 and the AFC Daemon2, and between the AFC Daemon2 and the Gate Daemon2). The following two fields relate to the first data TLS connection. The value of the Src AF Index field indicates an index of the AFC Daemon or the Gate Daemon which actively establishes the data TLS connection. The value of the Dst AF Index field indicates an index of the AFC Daemon or the Gate Daemon which passively establishes the data TLS connection. In this example, the value of the Src Daemon Index field is 0, which indicates the Gate Daemon1. The value of the Dst Daemon Index field is 1, which indicates the AFC Daemon1. Hereinafter, four sets of two fields indicate four data TLS connections.

The value of the No of Conditions field indicates the number of conditions in a case where the AFC branches depending on the AF return value. In this example, the value is 1 (branch in the AFC Daemon1). The following five fields relate to one condition. The value of an AF Index field is an AF index for setting this condition. In this example, the value is 1, which indicates the AF1. The value of an Operator field indicates an operator to be applied to the return value of the AF. In this example, it is OP-aft. The value of an Operand field indicates an operand of the above operator. In this example, it is Opd-af1. The value of the True Conn Index field is an index of a data TLS connection for transmitting the application message when the result of the above operation is true. In this example, the value is 1 (the data TLS connection from the AF1 to the AF2). The value of the False Conn Index field is an index of a data TLS connection for transmitting the application message when the result of the above operation is false. In this example, the value is 2 (the data TLS connection from the AF1 to the AF3).

When receiving the AFC Setup Request packet, the AFC Manager verifies that the AFC User0 has the authority to use the Gate Daemon1, the AF1, the AF2, the AF3, and the Gate Daemon2 on the basis of five set pairs of the values of the AF ID field and the values of the Certificate field included in the AFC Setup Request packet. Subsequently, the AFC Manager establishes five data TLS connections indicated by the AFC Setup Request packet. In order to establish the first connection (between the Gate Daemon1 and the AFC Daemon1), the AFC Manager transmits a Conn Estab P Request packet illustrated in FIG. 29 to the AFC Daemon1 (step S303). The values of the fields are as follows. The value of the Packet Type field is "Conn Estab P Request".

Then, when receiving the Conn Estab P Request packet, the AFC Daemon1 generates DPt-af1-gt1 which is a port for passively establishing a data TLS connection. Subsequently, the AFC Daemon1 transmits the Conn Estab P Response packet illustrated in FIG. 30 to the AFC Manager (step S304). The values of the fields are as follows. The value of the Packet Type field is "Conn Estab P Response". The value of the Status field is "OK" indicating that the processing is normal. The value of the Data Port field is DPt-af1-gt1.

When receiving the Conn Estab P Response packet, the AFC Manager transmits the Conn Estab A Request packet illustrated in FIG. 31 to the Gate Daemon1 (step S305). The values of the fields are as follows. The value of the Packet Type field is "Conn Estab A Request". The value of the IP Address field is IP-afn1. The value of the Data Port field is DPt-af1-gt1.

When receiving the Conn Estab A Request packet, the Gate Daemon1 establishes a data TLS connection with DPt-af1-gt1, which is a data port of the AFC Daemon1 (step S306). Here, the port for the data TLS connection in the Gate Daemon1 is set to DPt-gt1-af1. In addition, the socket for the data TLS connection in the Gate Daemon1 is set to DSock-gt1-af1. In addition, the socket for the data TLS connection in the AFC Daemon1 is set to DSock-af1-gt1.

Then, the Gate Daemon1 transmits the Conn Estab A Response packet illustrated in FIG. 32 to the AFC Manager (step S307). The values of the fields are as follows. The value of the Packet Type field is "Conn Estab A Response". The value of the Status field is "OK" indicating that the processing is normal. The value of the Data Socket field is DSock-gt1-af1.

Incidentally, the data TLS connections between the AFC Daemon1 and the AFC Daemon2, between the AFC Daemon1 and the AFC Daemon3, between the AFC Daemon3 and the AFC Daemon2, and between the AFC Daemon2 and the Gate Daemon2 are also established in the same manner as in steps S303 to S307 described above (step S308).

Here, in the data TLS connection between the AFC Daemon1 and the AFC Daemon2, the port in the AFC Daemon1 is DPt-af1-af2, and the socket is DSock-af1-af2. In addition, the port in the AFC Daemon2 is DPt-af2-af1, and the socket is DSock-af2-af1.

In addition, in the data TLS connection between the AFC Daemon1 and the AFC Daemon3, the port in the AFC Daemon1 is DPt-af1-af3, and the socket is DSock-af1-af3. In addition, the port in the AFC Daemon3 is DPt-af3-af1, and the socket is DSock-af3-af1.

In addition, in the data TLS connection between the AFC Daemon3 and the AFC Daemon2, the port in the AFC Daemon3 is DPt-af3-af2, and the socket is DSock-af3-af2. In addition, the port in the AFC Daemon2 is DPt-af2-af3, and the socket is DSock-af2-af3.

In addition, in the data TLS connection between the AFC Daemon2 and the Gate Daemon2, the port in the AFC Daemon2 is DPt-af2-gt2, and the socket is DSock-af2-gt2. In addition, the port in the Gate Daemon2 is DPt-gt2-af2, and the socket is DSock-gt2-af2.

The AFC Manager knows sockets for data TLS connections in each AFC Daemon and each Gate Deamon.

Subsequently, the AFC Manager transmits the Set Condition Request packet illustrated in FIG. 33 to the AFC Daemon1 (step S309). The values of the fields are as follows. The value of the Packet Type field is “Set Condition Request”. The value of the Operator field is Op-af1. The value of the Operand field is Opd-af1. The value of the True DataSocket field is DSock-af1-af2. The value of the False Data Socket field is DSock-af1-af3.

Then, when receiving the Set Condition Request packet, the AFC Daemon1 stores the value of the Operator field, the value of the Operand field, the value of the True Data Socket field, and the value of the False Data Socket field in its own AFC Table. Subsequently, the AFC Daemon1 transmits the Set Condition Response packet illustrated in FIG. 34 to the AFC Manager (step S310). The values of the fields are as follows. The value of the Packet Type field is “Set Condition Response”. The value of the Status field is “OK” indicating that the processing is normal.

Then, when receiving the Set Condition Response packet, the AFC Manager generates and stores SKey-usr0-afc1 as the AFC Session Key (step S311), and transmits the Set Session Key Request packet illustrated in FIG. 35 to the Gate Daemon1 (step S312). The values of the fields are as follows. The value of the Packet Type field is “Set Session Key Request”. The value of the AFC Session Key field is SKey-usr0-afc1.

Then, when receiving the Set Session Key Request packet, the Gate Daemon1 stores the value of the AFC Session Key field in its own AFC Table (step S313), and transmits the Set Session Key Response packet illustrated in FIG. 36 to the AFC Manager (step S314). The values of the fields are as follows. The value of the Packet Type field is “Set Session Key Response”. The value of the Status field is “OK” indicating that the processing is normal.

Then, when receiving the Set Session Key Response packet, the AFC Manager transmits the Accounting Notification packet illustrated in FIG. 37 to the AAA Server (step S315). The values of the fields are as follows. The value of the Packet Type field is “Accounting Notification”. The value of the User ID field is UID-usr0. The value of the Usage field is “AFC Setup” indicating the installation of the AFC. The value of the AF ID field is [null]. The value of the AFC ID field is AFCID-afc1.

When receiving the Accounting Notification packet, the AAA Server records the value of the Usage field (step S316).

In addition, when receiving the Set Session Key Response packet, the AFC Manager transmits the AFC Setup Response packet illustrated in FIG. 28 to the AFC Constructor (step S317). The values of the fields are as follows. The value of the Packet Type field is “AFC Setup Response”. The value of the AFC ID field is AFCID-afc1. The value of the Status field is “OK” indicating that the processing is normal. The value of the Data Port field is DPt-gt1-app. The value of the AFC Session Key field is SKey-usr0-afc1.

Then, when receiving the AFC Setup Response packet, the AFC Constructor stores the value of the AFC Session Key field (step S318), and releases the control TLS connection with the AFC Manager (step S319).

Figure 38:
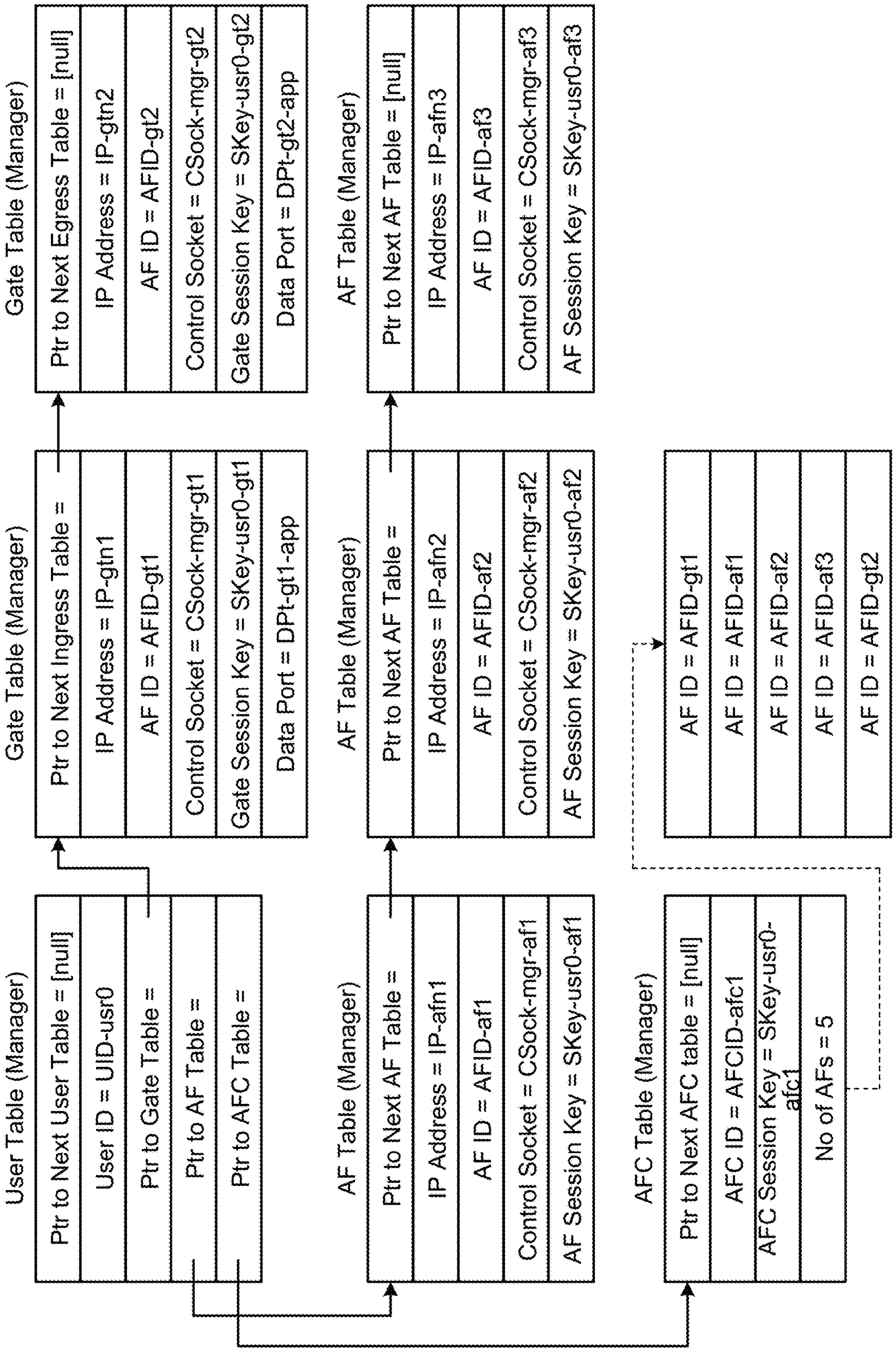
FIG. 38 is a diagram illustrating an exemplary structure of each table held by AFC Manager after the installation of AFC.

As a result of installing the AFC1 by the above processing, the AFC Manager holds each table illustrated in FIG. 38. Here, in comparison with the table illustrated in FIG. 21, the AFC Table is added, and the value of the Ptr to AFC Table field of the User Table is a pointer pointing to the AFC Table. The values of the fields of the AFC Table are as follows. The value of the Ptr to Next AFC Table field is [null]. The value of the AFC ID field is AFCID-afc1. The value of the AFC Session Key field is SKey-usr0-afc1. The value of the No of AFs field is 5. This is obtained by adding 2, which is the number of the Gate Daemons, to 3, which is the number of the AFs included in this AFC. The following five fields indicate the identifiers of the Gate Daemons or AFs.

In addition, after the AFC1 is installed, the Gate Daemon1 holds the Ingress Table illustrated in FIG. 39. Here, in comparison with the Gate Table illustrated in FIG. 11, the value of the Data Output Socket field is DSock-gt1-af1. This socket is for the Gate Daemon1 to transmit an application message to the AFC Daemon1.

In addition, after the AFC1 is installed, the Gate Daemon2 holds the Egress Table illustrated in FIG. 40. Here, in comparison with the Gate Table illustrated in FIG. 12, the value of the No of Data Input Sockets field is 1, one Data Input Socket field is added, and the value thereof is DSock-gt2-af2. This socket is for the Gate Daemon2 to receive an application message from the AFC Daemon2.

In addition, after the AFC1 is installed, the AFC Daemon1 holds the AFC Table illustrated in FIG. 41. Here, in comparison with the AFC Table illustrated in FIG. 22, the value of the No of Data Input Sockets field is 1, one Data Input Socket field is added, and the value thereof is DSock-af1-gt1. In addition, the value of the No of Data Output Sockets field is 2, two Data Output Socket fields are added, and the values thereof are DSock-af1-af2 and DSock-af1-af3, respectively. Further, the value of the Operator field is Op-af1, the value of the Operand field is Opd-af1, the value of the True Data Output Socket Index field is 0, and the value of the False Data Output Socket Index field is 1.

In addition, after the AFC1 is installed, the AFC Daemon2 holds the AFC Table illustrated in FIG. 42. Here, in comparison with the AFC Table illustrated in FIG. 23, the value of the No of Data Input Sockets field is 2, two Data Input Socket fields are added, and the values thereof are DSock-af2-af1 and DSock-af2-af3, respectively. In addition, the value of the No of Data Output Sockets field is 1, one Data Output Socket field is added, and the value thereof is DSock-af2-gt2. Further, the value of the True Data Output Socket Index field is 0.

In addition, after the AFC1 is installed, the AFC Daemon3 holds the AFC Table illustrated in FIG. 43. Here, in comparison with the AFC Table illustrated in FIG. 24, the value of the No of Data Input Sockets field is 1, one Data Input Socket field is added, and the value thereof is DSock-af3-af1. In addition, the value of the No of Data Output Sockets field is 1, one Data Output Socket field is added, and the value thereof is DSock-af3-af2. Further, the value of the True Data Output Socket Index field is 0.

(Procedure for Granting AFC Use Authority)

Figure 44:
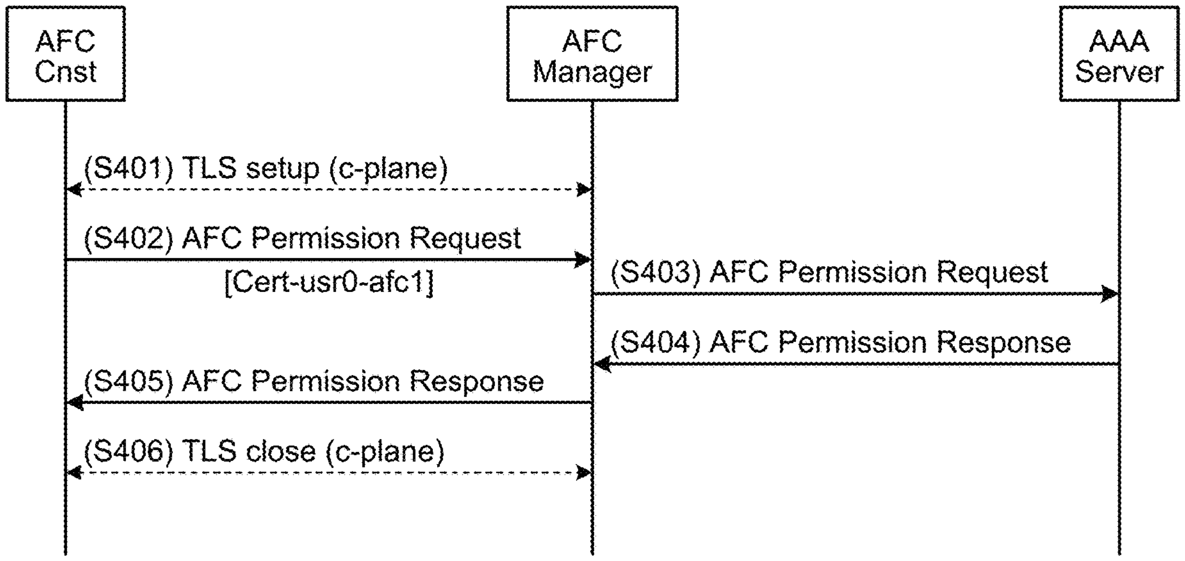
FIG. 44 is a diagram illustrating a processing procedure of processing of granting AFC use authority to an AF User.

Next, a processing procedure of a process of granting the AFC use authority will be described with reference to FIG. 44. FIG. 44 is a diagram illustrating the processing procedure of the process of granting the AFC use authority to the AF User. Such a process is a process of registering, in the AAA Server, that the AFC Constructor grants the AFC User1 the authority to use the AFC1 installed in the above procedure.

First, the AFC Constructor establishes a control TLS connection with the AFC Manager (step S401).

Then, the AFC Constructor transmits the AFC Permission Request packet illustrated in FIG. 45 to the AFC Manager (step S402). The values of the fields are as follows. The value of the Packet Type field is "AFC Permission Request". The value of the AFC ID field is AFCID-afc1. The value of the Constructor ID field is UID-usr0. The value of the Certificate field is Cert-usr0-afc1. As a method of creating Cert-usr0-afc1, it is conceivable to use a result obtained by adding SKey-usr0-afc1 to this packet and applying the result to a hash function. The value of the No of User IDs field is 1. The value of the User ID field is UID-usr1.

When receiving the FC Permission Request packet, the AFC Manager verifies that the AF User (AF User0) indicated by the value of the Constructor ID field is the creator of the AFC (AFC1) indicated by the AFC ID field, from the value of the AFC ID field, the value of the Constructor ID field, and the value of the Certificate field. Subsequently, in a case where the AF User (AF User0) indicated by the value of the Constructor ID field is determined to be the creator of the AFC (AFC1) indicated by the AFC ID field, the AFC Manager transfers the AFC Permission Request packet to the AAA Server (step S403).

When receiving the AFC Permission Request packet, the AAA Server grants the use authority of the AFC (AFC1) indicated by the AFC ID field to the AFC User (AFC User1) indicated by the User ID field. Subsequently, the AAA Server transmits the AFC Permission Response packet illustrated in FIG. 46 to the AFC Manager (step S404). The values of the fields are as follows. The value of the Packet Type field is "AFC Permission Response". The value of the Status field is "OK" indicating that the processing is normal.

When receiving the AFC Permission Response packet, the AFC Manager transfers the packet to the AFC Constructor (step S405).

When receiving the AFC Permission Response packet, the AFC Constructor releases the control TLS connection with the AFC Manager (step S406). Incidentally, the AFC Constructor grants the use right of the AFC1 to the AFC User2 in the same procedure as described above.

(Procedure of Acquiring AFC Session Key by Application)

Figure 47:
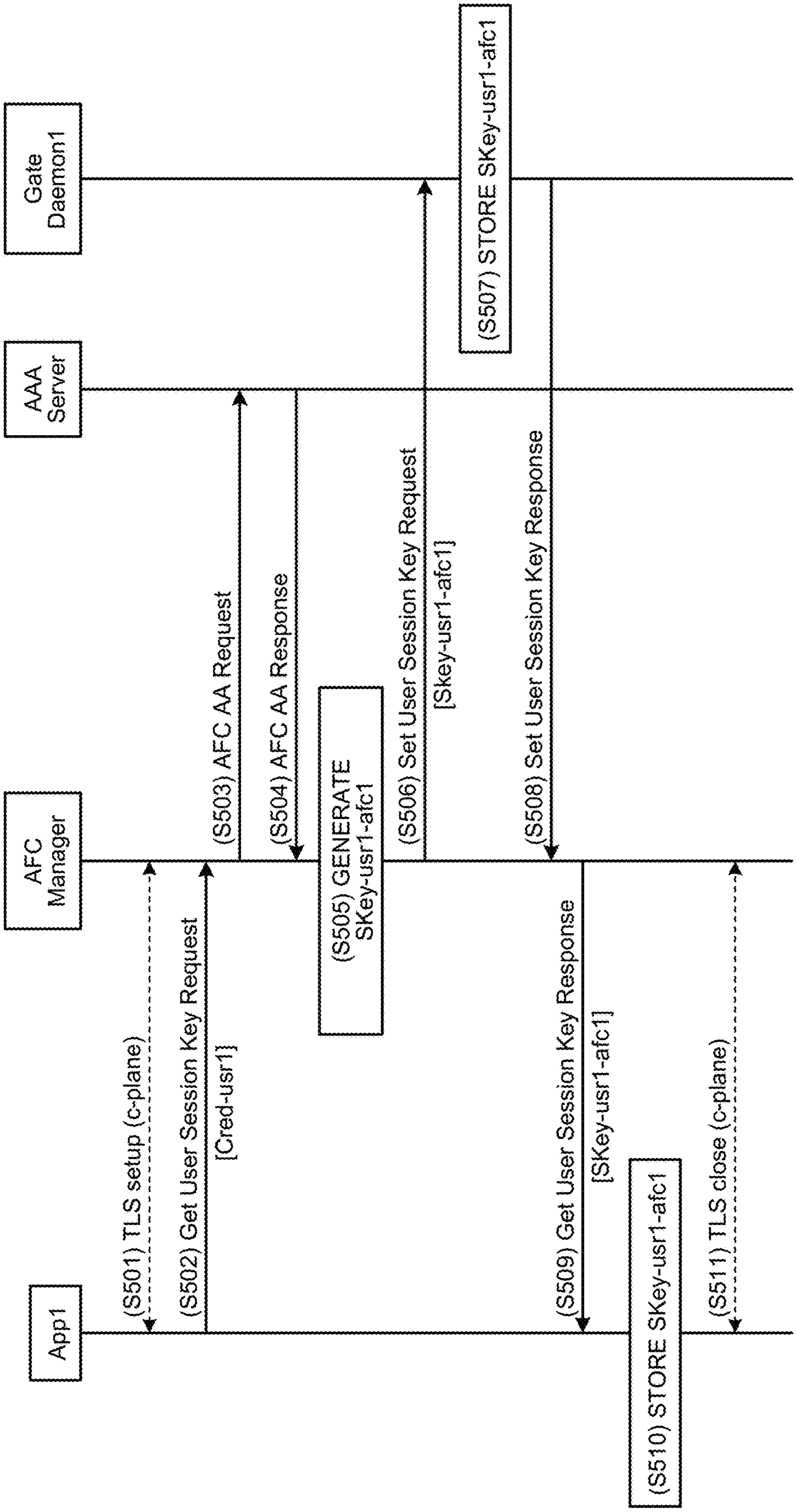
FIG. 47 is a diagram illustrating a processing procedure of processing of acquiring an AFC Session Key by an application.

Next, a processing procedure of processing of acquiring the AFC Session Key by an application will be described with reference to FIG. 47. FIG. 47 is a diagram illustrating the processing procedure of the processing of acquiring the AFC Session Key by the application.

First, the App1 establishes a control TLS connection with the AFC Manager (step S501).

Then, the App1 transmits a Get User Session Key Request packet illustrated in FIG. 48 to the AFC Manager (step S502). The values of the fields are as follows. The value of the Packet Type field is "Get User Session Key Request". The value of the AFC ID field is AFCID-afc1. The value of the User ID field is UID-usr1. The value of the Credential field is Cred-usr1. The content of Cred-user1 may be a password of the AFC User1 or the like.

Figures 50, 51:
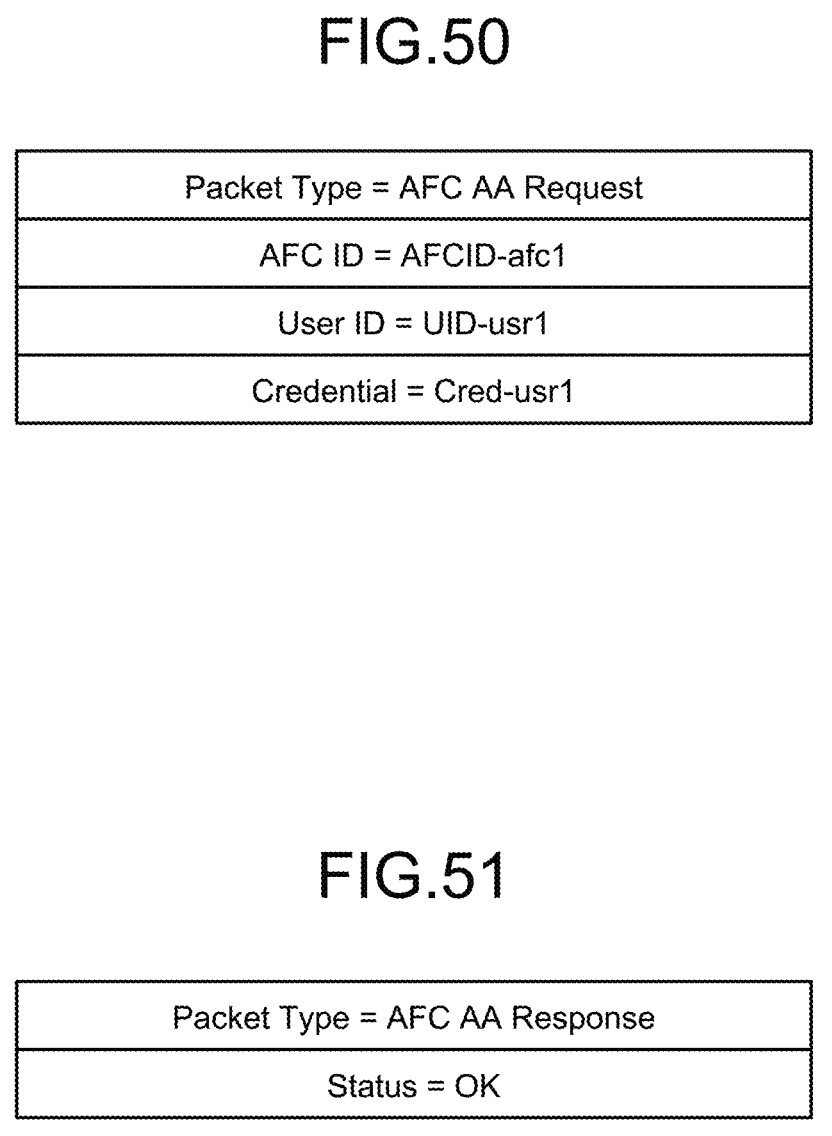

When receiving the Get User Session Key Request packet, the AFC Manager transmits the AFC AA Request packet illustrated in FIG. 50 to the AAA Server (step S503). The values of the fields are as follows. The value of the Packet Type field is "AFC AA Request". The value of the AFC ID field is AFCID-afc1. The value of the User ID field is UID-usr1. The value of the Credential field is Cred-usr1.

When receiving the AFC AA Request packet, the AAA Server verifies that the AFC user (AFC User1) indicated by the User ID field has authority to use the AFC (AFC1) indicated by the AFC ID field, from the value of the AFC ID field, the value of the User ID field, and the value of the Credential field. Subsequently, in a case where it is determined that the AFC user (AFC User1) indicated by the User ID field has authority to use the AFC (AFC1) indicated by the AFC ID field, the AAA Server transmits the AFC AA Response packet illustrated in FIG. 51 to the AFC Manager (step S504). The values of the fields are as follows. The value of the Packet Type field is "AFC AA Response". The value of the Status field is "OK" indicating that the processing is normal.

Then, when receiving the AFC AA Response packet, the AFC Manager generates SKey-usr1-afc1 as a User Session Key (step S505) and transmits a Set User Session Key Request packet illustrated in FIG. 52 to the Gate Daemon1 (step S506). The values of the fields are as follows. The value of the Packet Type field is "Set User Session Key Request". The value of the AFC ID field is AFCID-afc1. The value of the User ID field is UID-usr1. The value of the User Session Key field is SKey-usr1-afc1.

When receiving the Set User Session Key Request packet, the Gate Daemon1 stores the value (SKey-usr1-afc1) of the User Session Key field (step S507), and transmits the Set User Session Key Response packet illustrated in FIG. 53 to the AFC Manager (step S508). The values of the fields are as follows. The value of the Packet Type field is "Set User Session Key Response". The value of the Status field is "OK" indicating that the processing is normal.

Then, when receiving the Set User Session Key Response packet, the AFC Manager transmits a Get User Session Key Response packet illustrated in FIG. 49 to the App1 (step S509). The value of the Packet Type field is "Get User Session Key Response". The value of the Status field is "OK" indicating that the processing is normal. The value of the User Session Key field is SKey-usr1-afc1. The value of the Data Port field is DPt-gt1-app. The value of the IP Address field is IP-gtn1.

Then, when receiving the Get User Session Key Response packet, the App1 stores the value (SKey-usr1-afc1) of the User Session Key field, the value of the Data Port field (DPt-gt1-app), and the value of the IP Address field (IP-gtn1) (step S510), and releases the control TLS connection with the AFC Manager (step S511).

As a result of this processing, the Gate Daemon1 holds the Ingress Table illustrated in FIG. 54. Here, in comparison with the Ingress Table illustrated in FIG. 39, the value of the No of Input Apps field is 1, and a User ID field, a User Session Key field, and a Data Input Socket field are added. The value of the User ID field is UID-usr1. The value of the User Session Key field is SKey-usr1-afc1. The value of the Data Input Socket field is undefined ([undef]) at this point.

Incidentally, the App2 performs similar processing. As a result, the Gate Daemon2 holds the Egress Table illustrated in FIG. 55. Here, in comparison with the Egress Table illustrated in FIG. 40, the value of the No of Output Apps field is 1, and a User ID field, a User Session Key field, and a Data Output Socket field are added. The value of the User ID field is UID-usr2. The value of the User Session Key field is SKey-usr2-afc1. The value of the Data Output Socket field is undefined ([undef]) at this point.

(First Data Communication Procedure)

Figure 56:
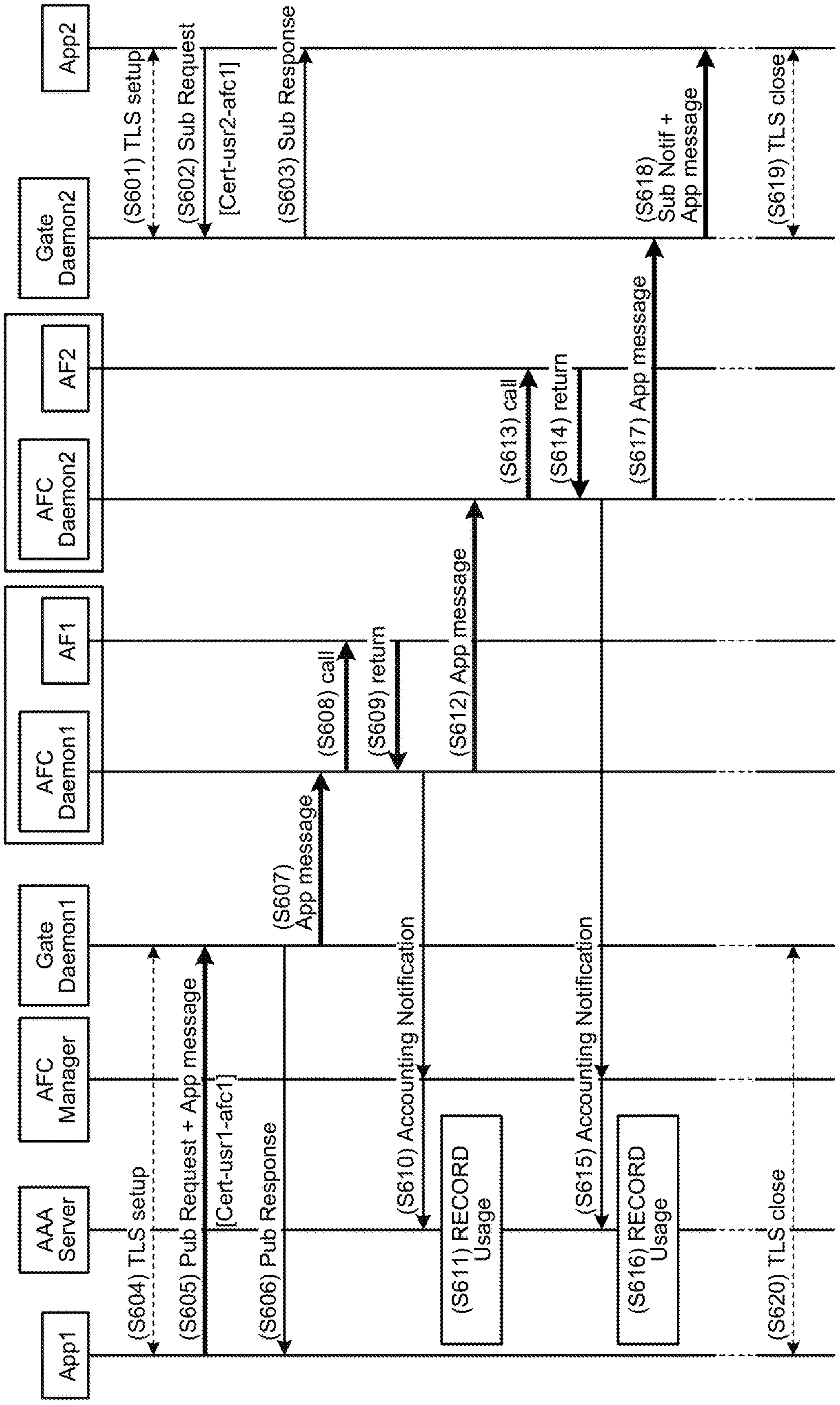
FIG. 56 is a diagram illustrating a processing procedure of first data communication processing.

Next, a processing procedure of first data communication processing in the AFC will be described with reference to FIG. 56. FIG. 56 is a diagram illustrating the processing procedure of the first data communication processing. In the AFC architecture illustrated in FIG. 2, the AF of the next stage branches into the AF2 and the AF3 in the AF1, but it is assumed that the AF2 is selected in the example of FIG. 56.

The App1 transmits an application message to the Gate Daemon1. The application message is processed in the AF1 and subsequently processed in the AF2. The App2 receives the application message from the Gate Daemon2.

Here, the IP address of App Node1 is IP-appn1. In addition, the port used by the AFC App1 for data communication is DPt-app1. In addition, the IP address of App Node2 is IP-appn2. In addition, the port used by the AFC App2 for data communication is DPt-app2.

First, the App2 establishes a data TLS connection with the Gate Daemon2 (step S601). Here, the port for the data TLS connection in the Gate Daemon2 is DPt-gt2-app2, and the socket is DSock-gt2-app2. As a result, the Gate Daemon2 holds the Egress Table illustrated in FIG. 58. Here, in comparison with the Egress Table illustrated in FIG. 55, the value of the Data Output Socket field is DSock-gt2-app2.

Figure 59:
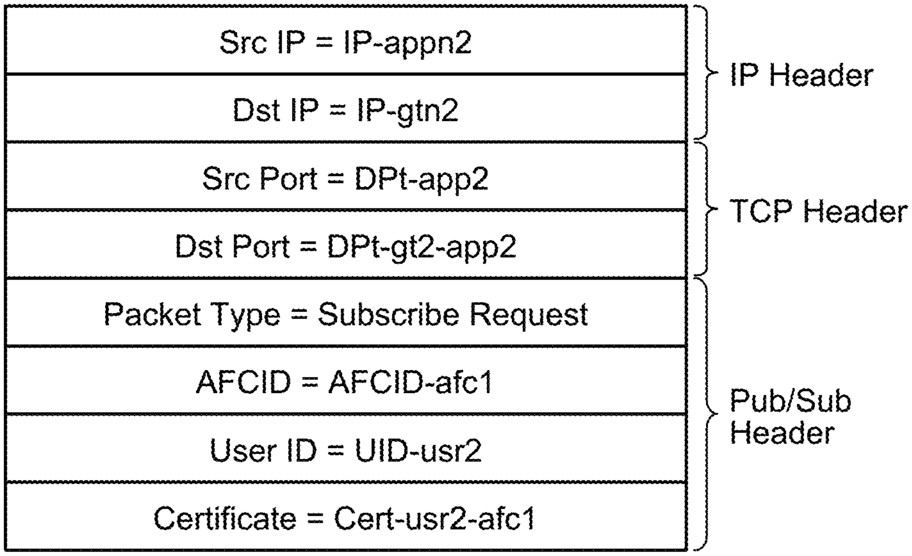
FIG. 59 is a diagram illustrating an exemplary structure of a Subscribe Request packet.

Then, in order to receive data from the AFC, the App2 transmits a Subscribe Request packet illustrated in FIG. 59 to the Gate Daemon2 (step S602). The Subscribe Request packet includes an IP header, a TCP header, and a Pub/Sub header. In the Pub/Sub header, the value of the Packet Type field is "Subscribe Request". The value of the AFC ID field is AFCID-afc1. The value of the User ID field is UID-usr2. The value of the Certificate field is Cert-usr2-afc1. As a method of creating Cert-usr2-afc1, it is conceivable to use a result obtained by adding SKey-usr2-afc1 to this packet and applying the result to a hash function.

For the TCP header, only a starting point port field (Src Port) and an ending point port field (Dst Port) are shown. The value of the Src Port field is DPt-app2, which is a port used by the App2 for the data TLS connection. The value of the Dst Port field is DPt-gt2-app2.

Regarding the IP header, only a starting point address field (Src IP) and an ending point address field (Dst IP) are shown. The value of the Src IP field is IP-appn2, which is the IP address of App Node2. The value of the Dst IP field is IP-gtn2.

Figure 60:
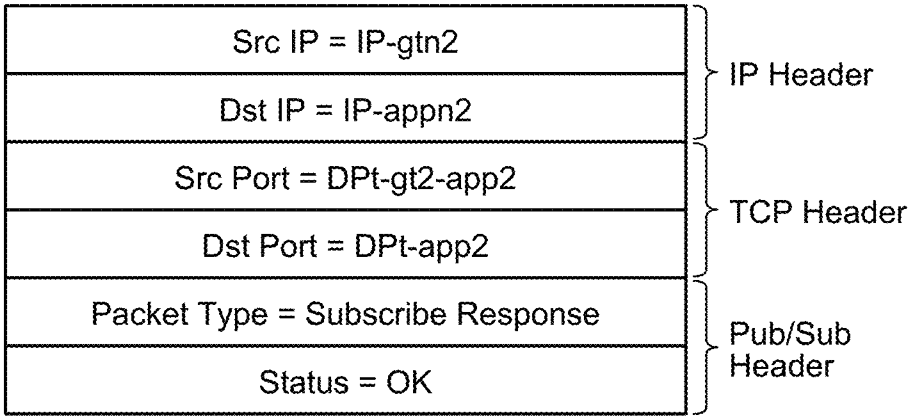
FIG. 60 is a diagram illustrating an exemplary structure of a Subscribe Response packet.

The Gate Daemon2 verifies that the App2 has authority to use the AFC, from the values of the AFC ID field, the User ID field, and the Certificate field of the Subscribe Request packet, and transmits the Subscribe Response packet illustrated in FIG. 60 to the App2 (step S603). The values of the fields are as follows. The values of the Src IP field and the Dst IP field and the values of the Src Port field and the Dst Sort field are exchanged with those of the Subscribe Request packet. The value of the Packet Type field is "Subscribe Response". The value of the Status field is "OK" indicating that the processing is normal.

In addition, the App1 establishes a data TLS connection with the Gate Daemon1 (step S604). Here, the port for the data TLS connection in the Gate Daemon1 is DPt-gt1-app1, and the socket is DSock-gt1-app1. As a result, the Gate Daemon1 holds the Gate Table illustrated in FIG. 57. Here, in comparison with the Gate Table illustrated in FIG. 54, the value of the Data Input Socket field is DSock-gt1-app1. This socket is for the Gate Daemon1 to receive an application message from the App1.

Figure 61:
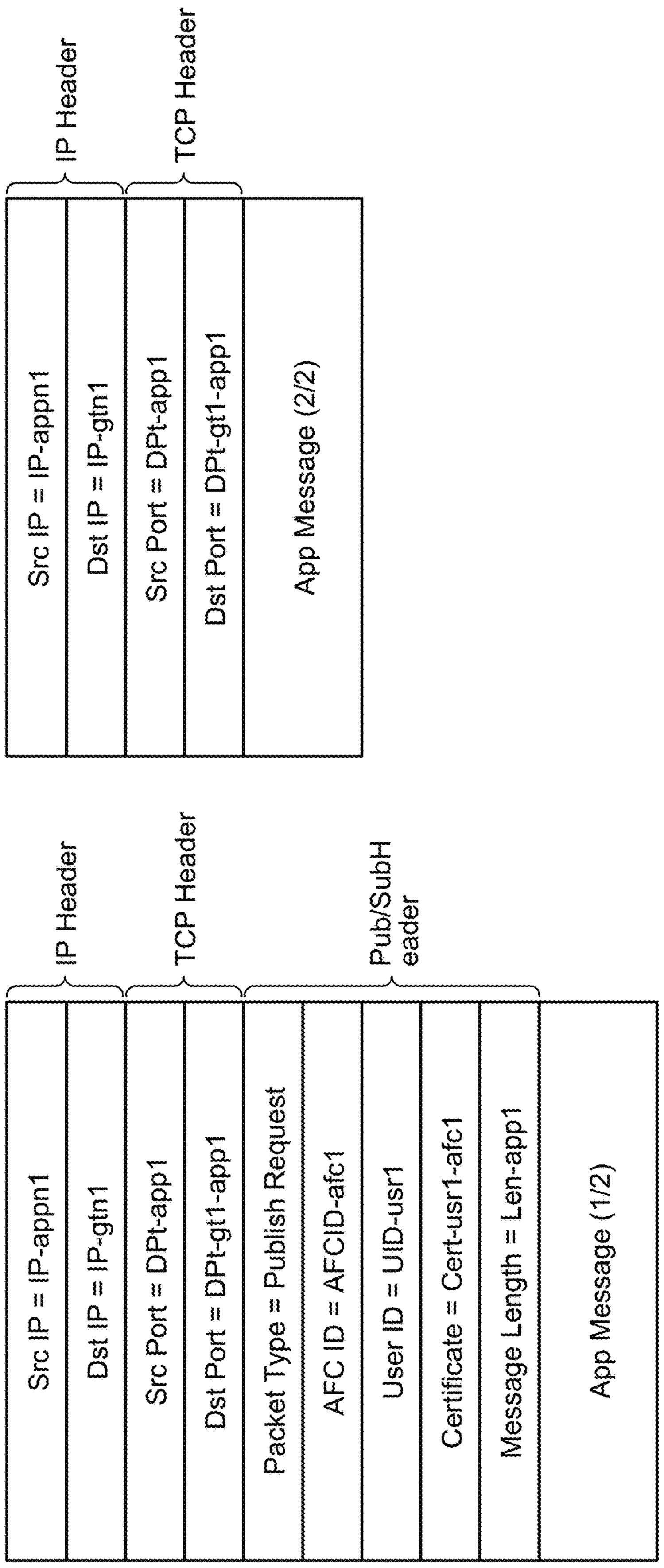
FIG. 61 is a diagram illustrating an exemplary structure of a Publish Request packet.

Then, in order to transmit the application message, the App1 transmits a Publish Request packet illustrated in FIG. 61 to the Gate Daemon1 (step S605). A Pub/Sub header is added to the application message, and a TCP header and an IP header are further added thereto. In this example, it is assumed that the application message length is long, and two TCP/IP packets are required.

In the Pub/Sub header, the value of the Packet Type field is "Publish Request". The value of the AFC ID field is AFCID-afc1. The value of the User ID field is UID-usr1. The value of the Certificate field is Cert-usr1-afc1. As a method of creating Cert-usr1-afc1, it is conceivable to use a result obtained by adding SKey-usr1-afc1 to this packet and applying the result to a hash function. The value of the Message Length field is Len-app1, which is a length of the application message.

For the TCP header, only a starting point port field (Src Port) and an ending point port field (Dst Port) are shown. The value of the Src Port field is DPt-app1, which is a port used by App1 for the data TLS connection. The value of the Dst Port field is DPt-g1-app1.

Regarding the IP header, only a starting point address field (Src IP) and an ending point address field (Dst IP) are shown. The value of the Src IP field is IP-appn1, which is an IP address of the App Node1. The value of the Dst IP field is IP-gtn1. The values of the IP header and the TCP header of the second packet are the same as those of the first packet.

Figure 62:
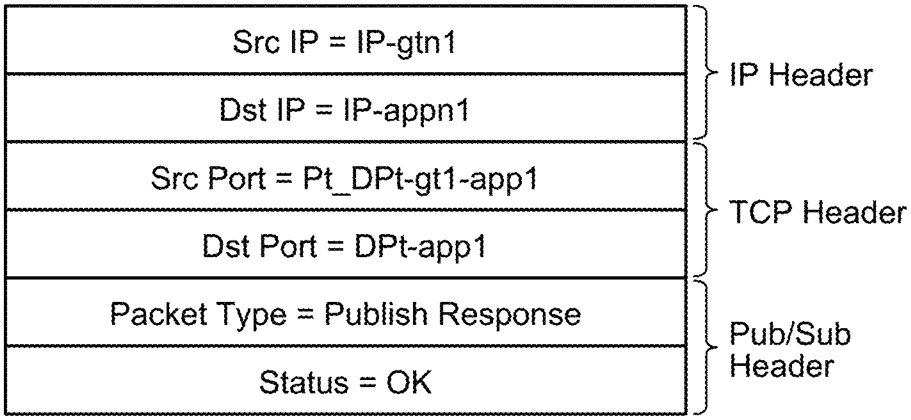
FIG. 62 is a diagram illustrating an exemplary structure of a Publish Response packet.

When receiving the Publish Request packet, the Gate Daemon1 verifies that the App1 has authority to use the AFC, from the values of the AFC ID field, the User ID field, and the Certificate field of the Publish Request packet, and transmits the Publish Response packet illustrated in FIG. 62 to the App1 (step S606).

In the Pub/Sub header, the value of the Packet Type field is "Publish Response". The value of the AFC ID field is AFCID-afc1. The value of the Status field is "OK" indicating that the processing is normal.

In the IP header and the TCP header, the values of the Src IP field and the Dst IP field and the values of the Src Port field and the Dst Sort field are exchanged with those of the Publish Request packet.

Figure 63:
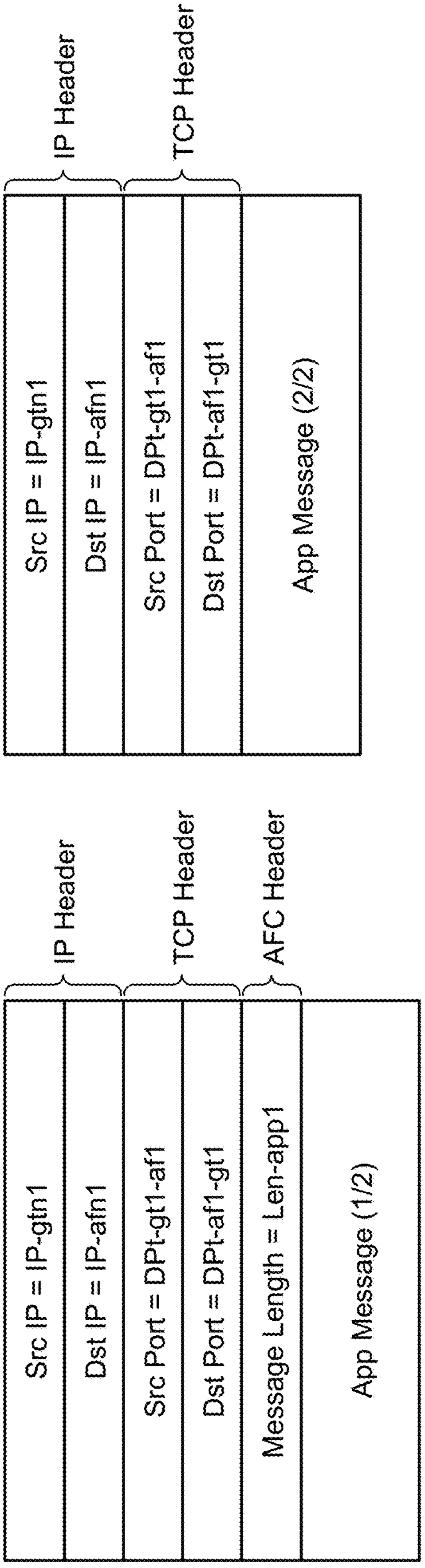
FIG. 63 is a diagram illustrating an exemplary structure of a data packet transmitted from the Gate Daemon1 to the AFC Daemon1.

Then, the Gate Daemon1 transmits the data packet illustrated in FIG. 63 to the AFC Daemon1 (step S607). An AFC header is added to the application message, and a TCP header and an IP header are further added. In this example, it is assumed that the application message length is long, and two TCP/IP packets are required. In the AFC header, the value of the Message Length field is Len-app1.

In the TCP header, the value of the Src Port field is DPt-gt1-af1, and the value of the Dst Port field is DPt-af1-gt1. In the IP header, the value of the Src IP field is IP-gtn1, and the value of the Dst IP field is IP-afn1. The values of the respective fields of the IP header and the TCP header of the second packet are the same as those of the first packet.

When receiving all the application messages, the AFC Daemon1 inputs the application messages to the AF1 via the port of Pt-af1-input (step S608).

Then, the AFC Daemon1 receives the application message from the AF1 via the port of Pt-af1-output and obtains the end state value of the AF1 via the port of Pt-aft-stat (step S609).

It is assumed that the application message size changes to Len-app1-af1 by the processing of the AF1. The AFC Daemon1 applies an operator of Op-1 indicated by the Operator field in FIG. 41 and an operand of Opd-1 indicated by the Operand field to the end state value of the AF1 to obtain a true/false value. In this example, it is assumed that the true/false value is true. Since the value of the True Data Output Socket field in the AFC Table illustrated in FIG. 41 is 0, DSock-af1-af2 with a Data Output Socket Index of 0 is used when a data packet is transmitted.

Then, the AFC Daemon1 transmits the Accounting Notification packet illustrated in FIG. 67 to the AFC Manager (step S610). The values of the fields in the Accounting Notification packet are as follows. The value of the Packet Type field is "Accounting Notification". The value of the User ID field is UID-usr1. The value of the Usage field indicates information on a resource used for AF. In this embodiment, the value of the Usage field is Usg-usr1-af1 representing the resource amount used in the execution of the AF1. As the resource amount, an application message size input to the AF1, an execution time of the AF1, and the like can be considered. The value of the AF ID field is AFID-af1. The value of the AFC ID field is AFCID-afc1. In addition, when receiving the Accounting Notification packet, the AFC Manager transfers the Accounting Notification packet to the AAA Server.

When receiving the Accounting Notification packet, the AAA Server records the value of the Usage field (step S611). The recorded value of the Usage field may be used for accounting (charging) of the AFC App by the AAA Server.

Figure 64:
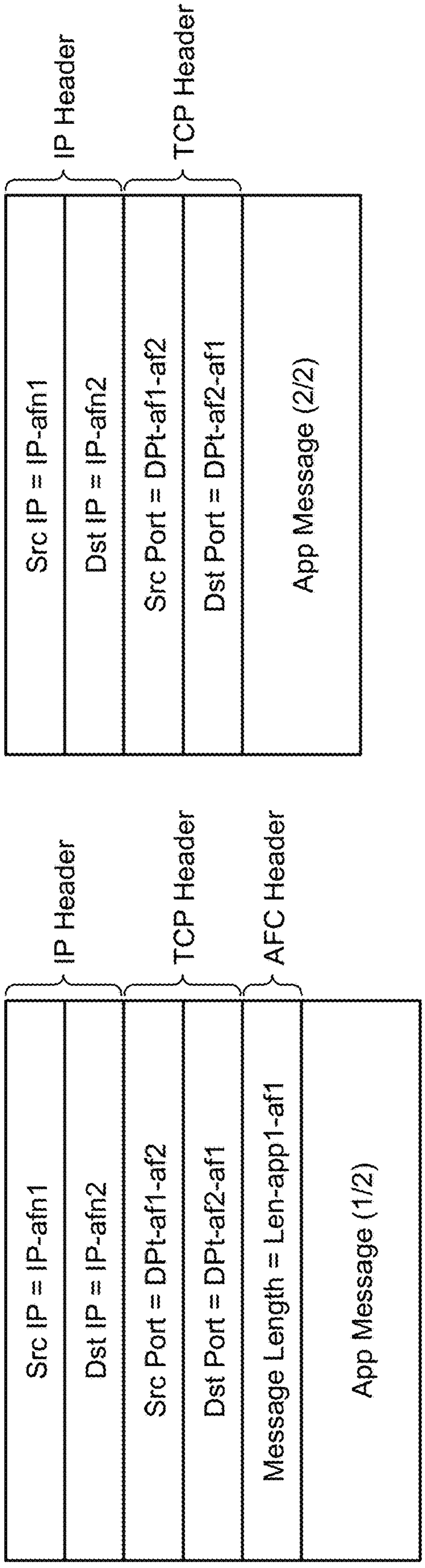
FIG. 64 is a diagram illustrating an exemplary structure of a data packet transmitted from the AFC Daemon1 to the AFC Daemon2.

In addition, the AFC Daemon1 transmits the data packet illustrated in FIG. 64 to the AFC Daemon2 (step S612). In the AFC header, the value of the App Message Length field is Len-app1-af1. In the TCP header, the value of the Src Port field is DPt-af1-af2, and the value of the Dst Port field is DPt-af2-af1. In the IP header, the value of the Src IP field is IP-afn1, and the value of the Dst IP field is IP-afn2. The values of the respective fields of the IP header and the TCP header of the second packet are the same as those of the first packet.

When receiving all the application messages, the AFC Daemon2 inputs the application messages to the AF2 via the port of Pt-af2-input (step S613).

Then, the AFC Daemon2 receives the application message from the AF2 via the port of Pt-af2-output (step S614).

It is assumed that the application message size changes to Len-app1-af2 by the processing of the AF2. Since the value of the Operator field of the AFC Table illustrated in FIG. 42 is [null], and the value of the True Data Output Socket field is 0, DSock-af1-af2 with a Data Output Socket Index of 0 is used when a data packet is transmitted.

Then, the AFC Daemon2 transmits an Accounting Notification packet to the AFC Manager as in step S610 (step S615). When receiving the Accounting Notification packet, the AFC Manager transfers the packet to the AAA Server.

When receiving the Accounting Notification packet, the AAA Server records the value of the Usage field (step S616).

Figure 65:
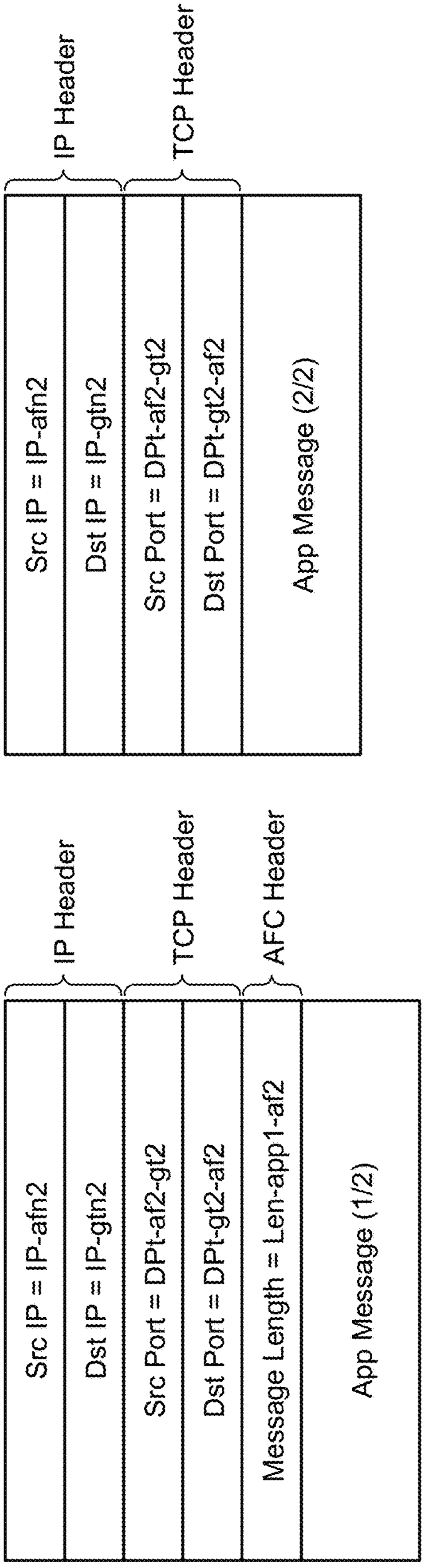
FIG. 65 is a diagram illustrating an exemplary structure of a data packet transmitted from the AFC Daemon2 to the Gate Daemon2.

In addition, the AFC Daemon2 transmits the data packet illustrated in FIG. 65 to the Gate Daemon2 (step S617). In the AFC header, the value of the Message Length field is Len-app1-af2. In the TCP header, the value of the Src Port field is DPt-af2-gt2, and the value of the Dst Port field is DPt-gt2-af2. In the IP header, the value of the Src IP field is IP-afn2, and the value of the Dst IP field is IP-gtn2. The values of the respective fields of the IP header and the TCP header of the second packet are the same as those of the first packet.

Figure 66:
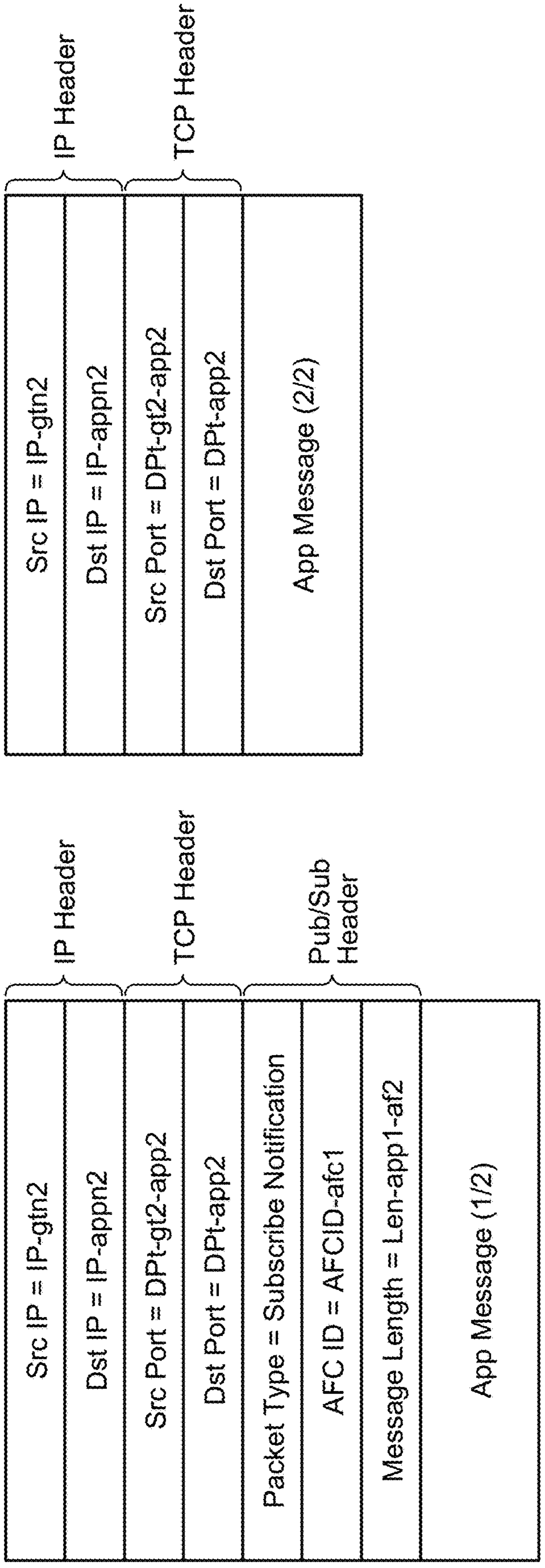
FIG. 66 is a diagram illustrating an exemplary structure of a data packet transmitted from the Gate Daemon2 to the App2.

Then, Gate Daemon2 receives the data packet. Since the Subscribe Request related to the AFC1 is received from the App2 in step S602, the Gate Daemon2 transmits the Subscribe Notification packet illustrated in FIG. 66 to the App2 on the basis of this (step S618).

In the Pub/Sub header, the value of the Packet Type field is "Subscribe Notification". The value of the AFC ID field is AFCID-afc1. The value of the Message Length field is Len-app1-af2. In the TCP header, the value of the Src Port field is DPt-gt2-app2, and the value of the Dst Port field is DPt-app2. In the IP header, the value of the Src IP field is IP-gtn2, and the value of the Dst IP field is IP-appn2. The values of the respective fields of the IP header and the TCP header of the second packet are the same as those of the first packet.

Then, when receiving the Subscribe Notification packet, the App2 releases the data TLS connection with the Gate Daemon2 (step S619). In addition, the App1 releases the data TLS connection with the Gate Daemon1 (step S620).

(Second Data Communication Procedure)

Figure 68:
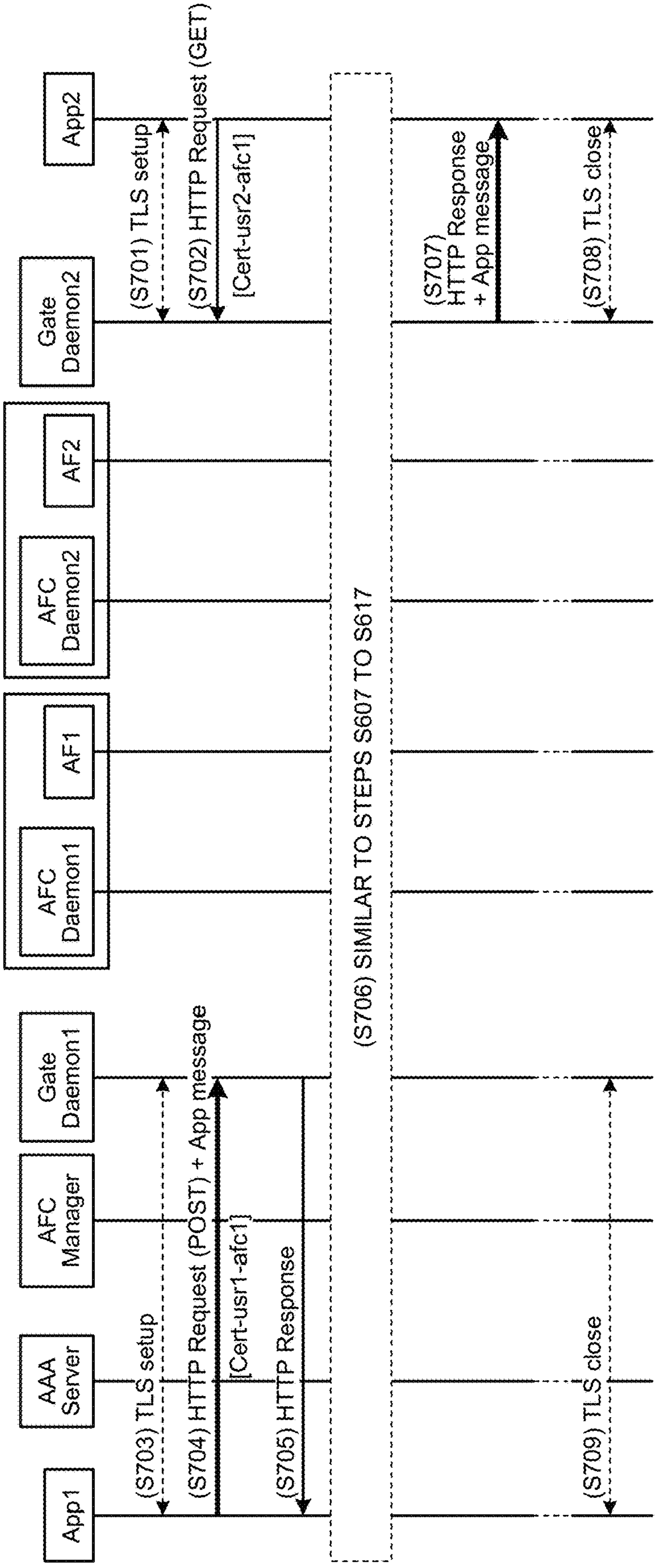
FIG. 68 is a diagram illustrating a processing procedure of second data communication processing.

Next, a processing procedure of second data communication processing in the AFC will be described with reference to FIG. 68. FIG. 68 is a diagram illustrating a processing procedure of the second data communication processing. Such a processing procedure is different from the first data communication processing described with reference to FIG. 56 in the following two points.

First, in FIG. 56, the App1 transmits an application message to the Gate Daemon1 in the Publish Request packet, but in FIG. 68, the App1 transmits an application message to the Gate Daemon1 in an HTTP Request message (POST) of hypertext transfer protocol (HTTP) communication.

Second, in FIG. 56, the App2 transmits an application message reception request to the Gate Daemon2 by the Subscribe Request packet and receives an application message by the Subscribe Notification packet, but in FIG. 68, the App2 transmits an application message reception request to the Gate Daemon2 by an HTTP Request message (GET) and receives an application message by the HTTP Response message.

Figure 69:
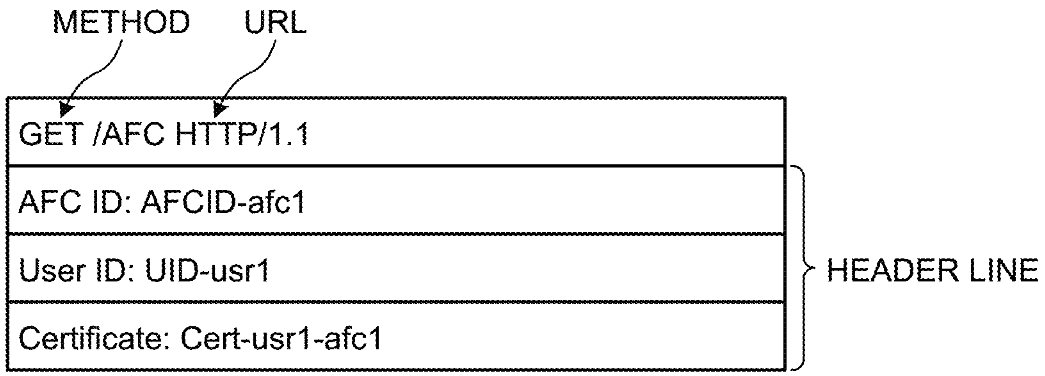
FIG. 69 is a diagram illustrating an exemplary structure of an HTTP Request message (GET).

First, step S701 is similar to step S601 in FIG. 56. Then, in order to receive data from the AFC, the App2 transmits the HTTP Request message illustrated in FIG. 69 to the Gate Daemon2 (step S702). Incidentally, the IP header and the TCP header are omitted in FIG. 69.

The value of the method field of the HTTP Request message is "GET". The value of the URL field is "/AFC". The first row of the header line indicates an AFC ID. The second row of the header line indicates a User ID. The third row of the header line indicates a Certificate. A method of creating the Certificate is equivalent to step S602 in FIG. 56.

Figure 70:
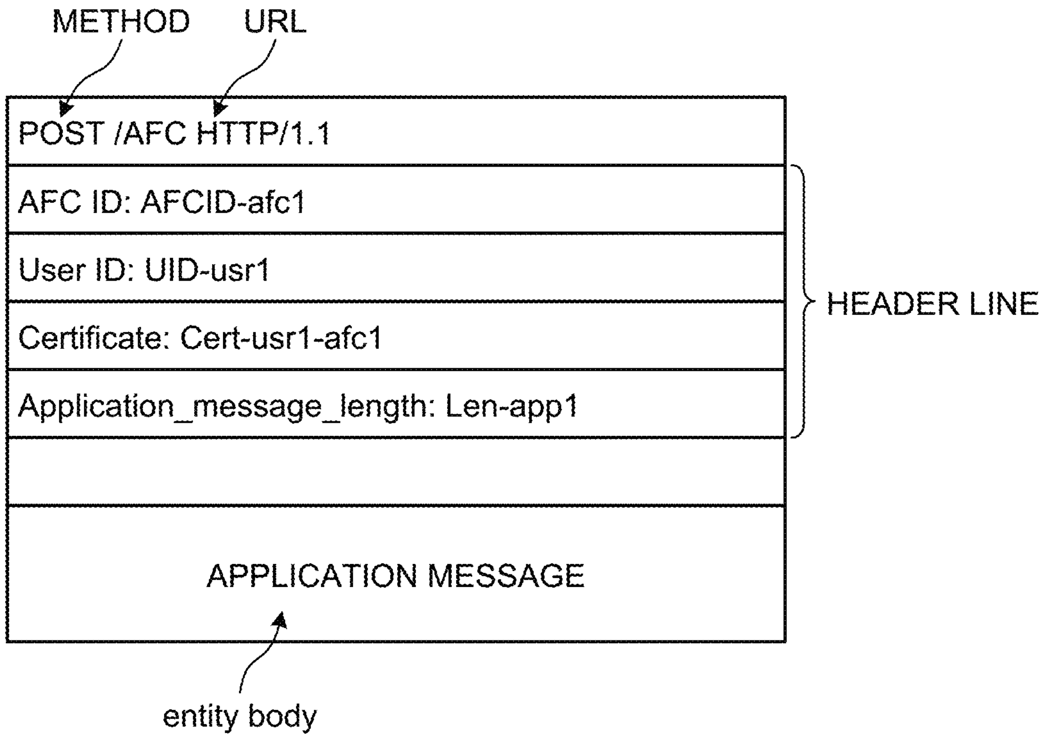
FIG. 70 is a diagram illustrating an exemplary structure of an HTTP Request message (POST).

Then, step S703 is similar to step S604 in FIG. 56. Then, in order to transmit the application message, the App1 transmits a POST Request message illustrated in FIG. 70 to the Gate Daemon1 (step S704). Incidentally, the IP header and the TCP header are omitted in FIG. 70.

The value of the method field of the HTTP Request message is "POST". The value of the URL field is "/AFC". The first row of the header line indicates an AFC ID. The second row of the header line indicates a User ID. The third row of the header line indicates a Certificate. A method of creating the Certificate is equivalent to step S605 in FIG. 56. The fourth row of the header line indicates an application message size. The application message is stored in the entity body field. When the application message size is large and does not fit in one packet, it is transmitted in a plurality of packets.

Figure 71:
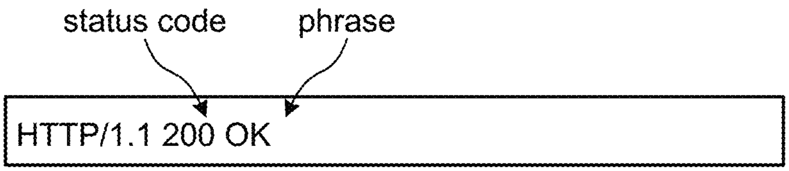
FIG. 71 is a diagram illustrating an exemplary structure of an HTTP Response message (POST).

The Gate Daemon1 verifies that the App1 has the authority to use the AFC, from the values of the User ID field and the Certificate field by the header line of the HTTP Request message, and transmits the HTTP Response message illustrated in FIG. 71 to the App1 (step S705). The value of the status code field of the HTTP Response message is "200", and the value of the phrase field is "OK".

Figure 72:
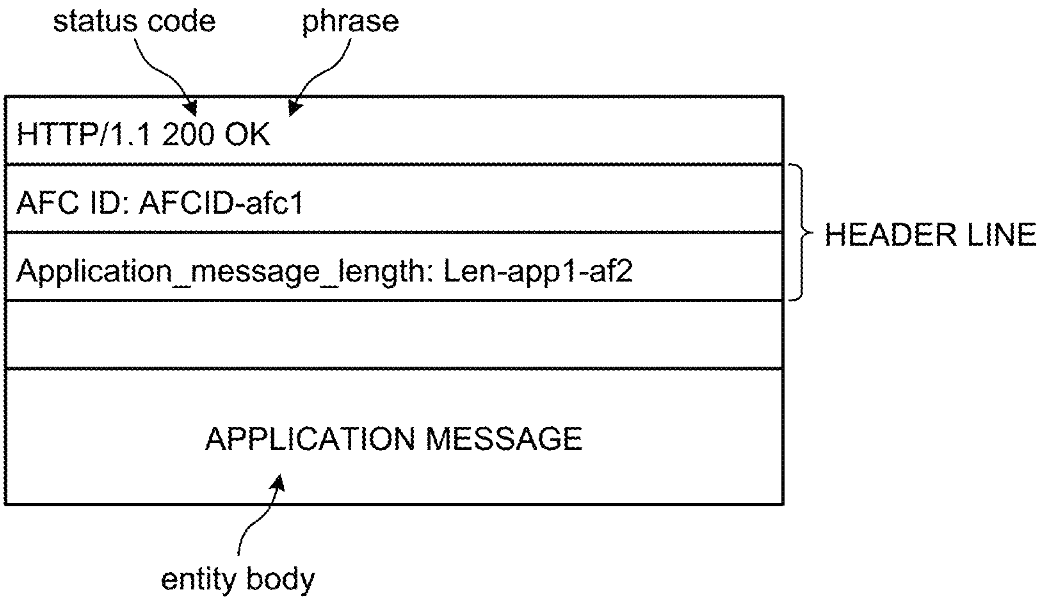
FIG. 72 is a diagram illustrating an exemplary structure of an HTTP Response message (GET).

Step S706 is similar to steps S607 to S617 illustrated in FIG. 56. Then, the Gate Daemon2 transmits the HTTP Response message illustrated in FIG. 72 to the App2 (step S707). The value of the status code field of the HTTP Response message is "200", and the value of the phrase field is "OK". The first row of the header line indicates an AFC ID. The second row of the header line indicates an application message size. The application message is stored in the entity body field. When the application message size is large and does not fit in one packet, it is transmitted in a plurality of packets.

Then, when receiving the HTTP Response message, the App2 releases the data TLS connection with the Gate Daemon2 (step S708). Further, the App1 releases the data TLS connection with the Gate Daemon1 (step S709).

(AFC Deletion Procedure)

Figure 73:
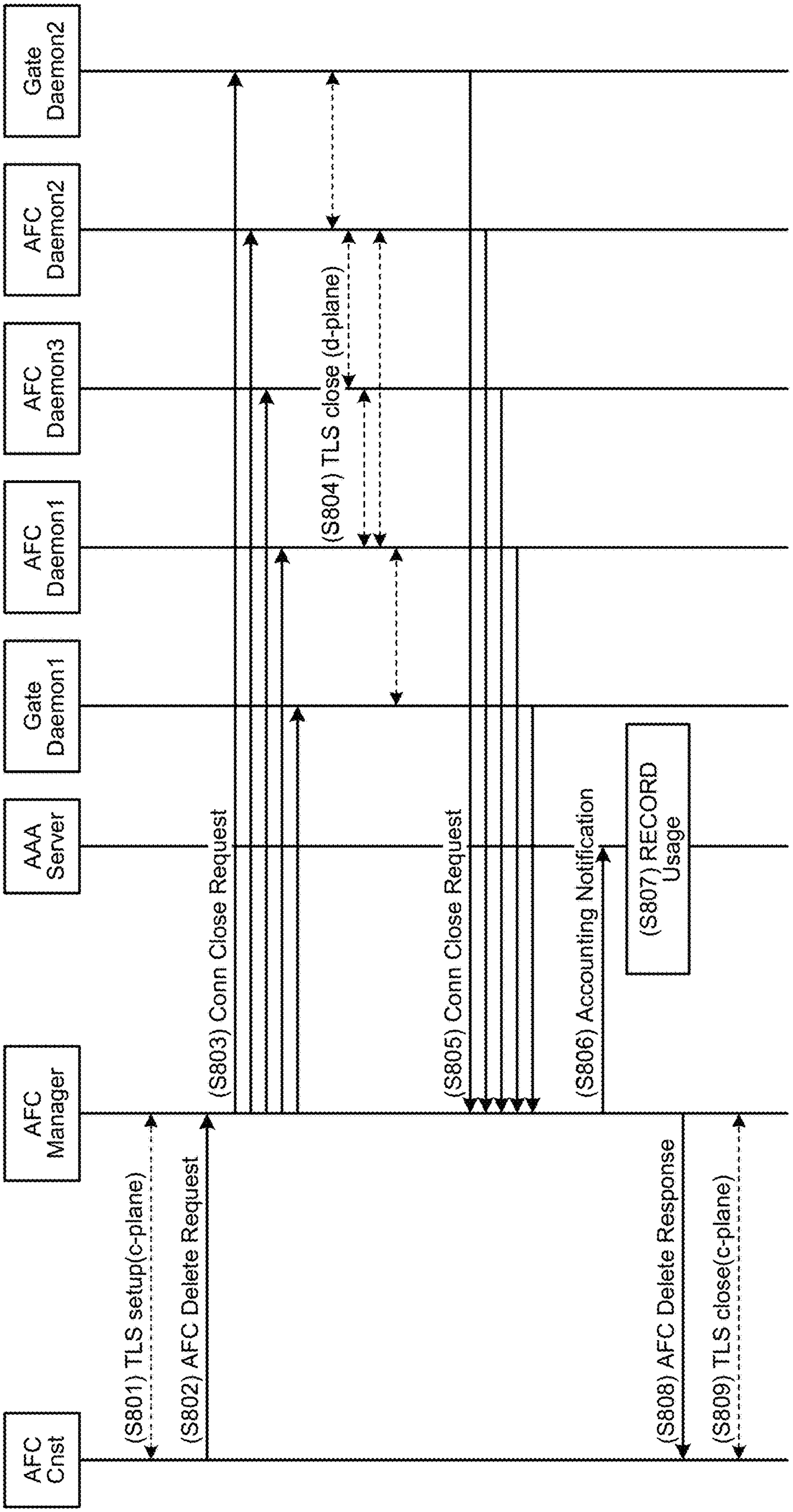
FIG. 73 is a diagram illustrating a processing procedure of AFC deletion processing.

Next, a procedure in which the AFC Constructor deletes the AFC will be described with reference to FIG. 73. FIG. 73 is a diagram illustrating a processing procedure of the AFC deletion processing. Incidentally, FIG. 73 illustrates a case where the AFC1 is deleted.

First, the AFC Constructor establishes a control TLS connection with the AFC Manager (step S801).

Then, the AFC Constructor transmits the AFC Delete Request packet illustrated in FIG. 74 to the AFC Manager (step S802). The values of the fields are as follows. The value of the Packet Type field is "AFC Delete Request". The value of the AFC ID field is AFCID-afc1. The value of the Certificate field is Cert-usr0-afc1. As a method of creating Cert-usr0-afc1, it is conceivable to use a result obtained by adding SKey-usr0-afc1 to this packet and applying the result to a hash function.

Then, when receiving the AFC Delete Request packet, the AFC Manager verifies that the AFC user (AFC User0) indicated by the User ID field has the authority to delete the AFC (AFC1) indicated by the AFC ID field, from the value of the User ID field, the value of the AFC ID field, and the value of the Certificate field. Subsequently, the AFC Daemon transmits the Connection Close Request packet illustrated in FIG. 76 to the Gate Daemon2, the AFC Daemon2, the AFC Daemon3, the AFC Daemon1, and the Gate Daemon1 (step S803). The values of the fields are as follows. The value of the Packet Type field is "Connection Close Request".

Then, the Gate Daemon2, the AFC Daemon2, the AFC Daemon3, the AFC Daemon1, and the Gate Daemon1 which have received the Connection Close Request packet release the data TLS connection for the AFC1 (step S804).

Subsequently, the Gate Daemon2, the AFC Daemon2, the AFC Daemon3, the AFC Daemon1, and the Gate Daemon1 transmit Connection Close Response packets illustrated in FIG. 77 to the AFC Daemon (step S805). The values of the fields are as follows. The value of the Packet Type field is "Connection Close Response". The value of the Status field is "OK" indicating that the processing is normal.

Then, the AFC Manager transmits the Accounting Notification packet illustrated in FIG. 78 to the AAA Server (step S806). The values of the fields are as follows. The value of the Packet Type field is "Accounting Notification". The value of the User ID field is UID-usr0. The value of the Usage field is "Delete AFC" indicating deletion of the AFC. The value of the AF ID field is [null]. The value of the AFC ID field is AFCID-afc1.

When receiving the Accounting Notification packet, the AAA Server records the value of the Usage field (step S807).

Then, the AFC Manager transmits the AFC Delete Response packet illustrated in FIG. 75 to the AFC Constructor (step S808). The values of the fields are as follows. The value of the Packet Type field is "AFC Delete Response". The value of the Status field is "OK" indicating that the processing is normal.

Then, the AFC Construtor releases the control TLS connection with the AFC Manager (step S809).

(AF Deletion Procedure)

Figure 79:
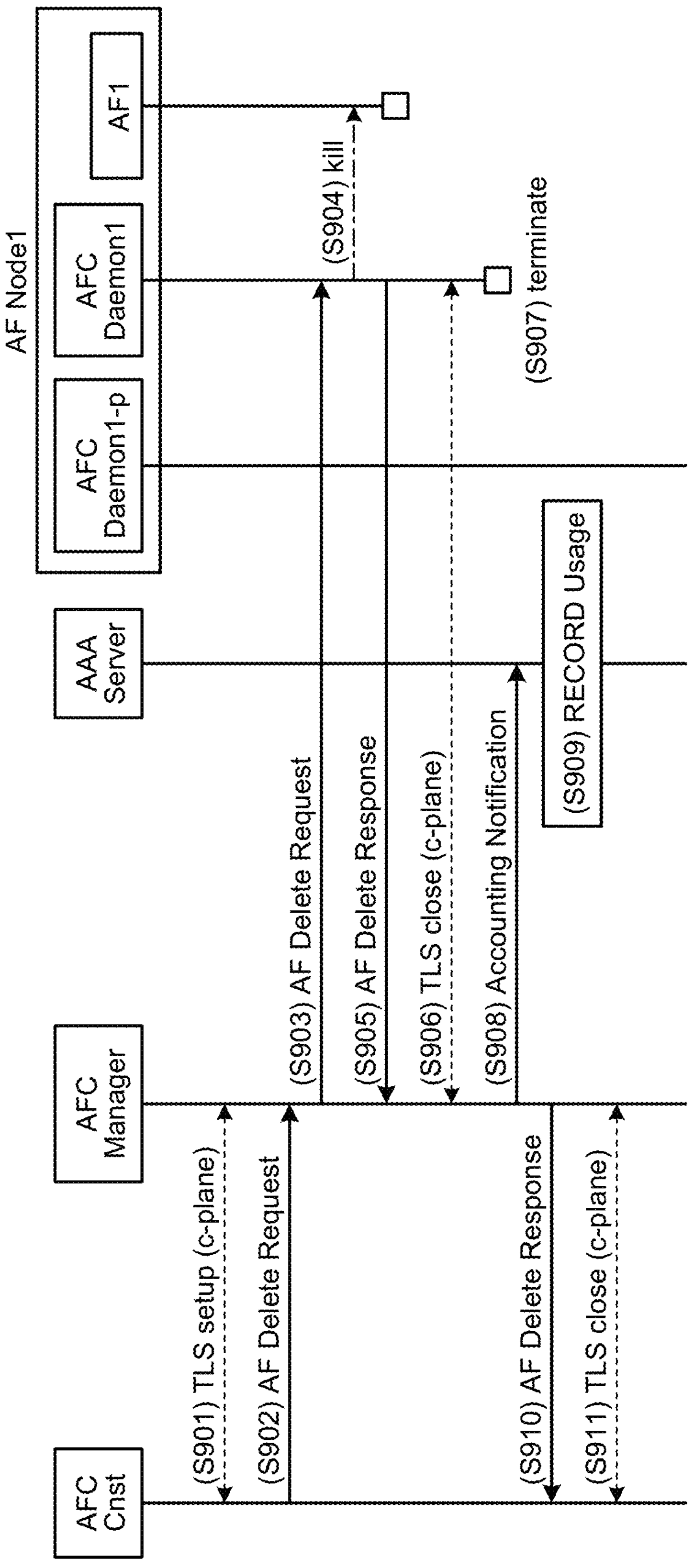
FIG. 79 is a diagram illustrating a processing procedure of AF deletion processing.

Next, a procedure in which the AFC Constructor deletes the AF will be described with reference to FIG. 79. FIG. 79 is a diagram illustrating a processing procedure of the AF deletion processing. Incidentally, FIG. 79 illustrates a case where the AF1 is deleted.

First, the AFC Constructor establishes a control TLS connection with the AFC Manager (step S901).

Then, the AFC Constructor transmits the AF Delete Request packet illustrated in FIG. 80 to the AFC Manager (step S902). The values of the fields are as follows. The value of the Packet Type field is "AF Delete Request". The value of the User ID field is UID-usr0. The value of the AF ID field is AFID-af1. The value of the Certificate field is Cert-usr0-af1. As a method of creating Cert-usr0-af1, it is conceivable to use a result obtained by applying to a hash function a value obtained by adding SKey-usr0-af1 to this packet.

Then, when receiving the AF Delete Request packet, the AFC Manager verifies that the AFC user (AFC User0) indicated by the User ID field has the authority to delete AF (AF1) indicated by the AF ID field, from the value of the User ID field, the value of the AF ID field, and the value of the Certificate field. Subsequently, the AFC Manager transfers the AF Delete Request packet to the AFC Daemon1 (step S903).

Then, when receiving the AF Delete Request packet, the AFC Daemon1 kills the operation of the AF1 (step S904).

Subsequently, the AFC Daemon1 transmits the AF Delete Response packet illustrated in FIG. 81 to the AFC Manager (step S905). The values of the fields are as follows. The value of the Packet Type field is "AF Delete Response". The value of the Status field is "OK" indicating that the processing is normal.

Then, when receiving the AF Delete Response packet, the AFC Manager releases the control TLS connection with the AFC Daemon1 (step S906), and the AFC Daemon1 terminates the operation (step S907).

Subsequently, the AFC Manager transmits the Accounting Notification packet illustrated in FIG. 82 to the AAA Server (step S908). The values of the fields are as follows. The value of the Packet Type field is "Accounting Notification". The value of the User ID field is UID-usr0. The value of the Usage field is "Delete AF" indicating deletion of the AF. The value of the AF ID field is AFID-af1. The value of the AFC ID field is [null].

When receiving the Accounting Notification packet, the AAA Server records the value of the Usage field (step S909).

Then, the AFC Manager transfers the AF Delete Response packet to the AFC Constructor (step S910), and the AFC Constructor releases the control TLS connection with the AFC Manager (step S911).

Incidentally, in a case where the AFC Constructor deletes the AF2 and the AF3, the same procedure as described above is performed.

(Gate Daemon Deletion Procedure)

Figure 83:
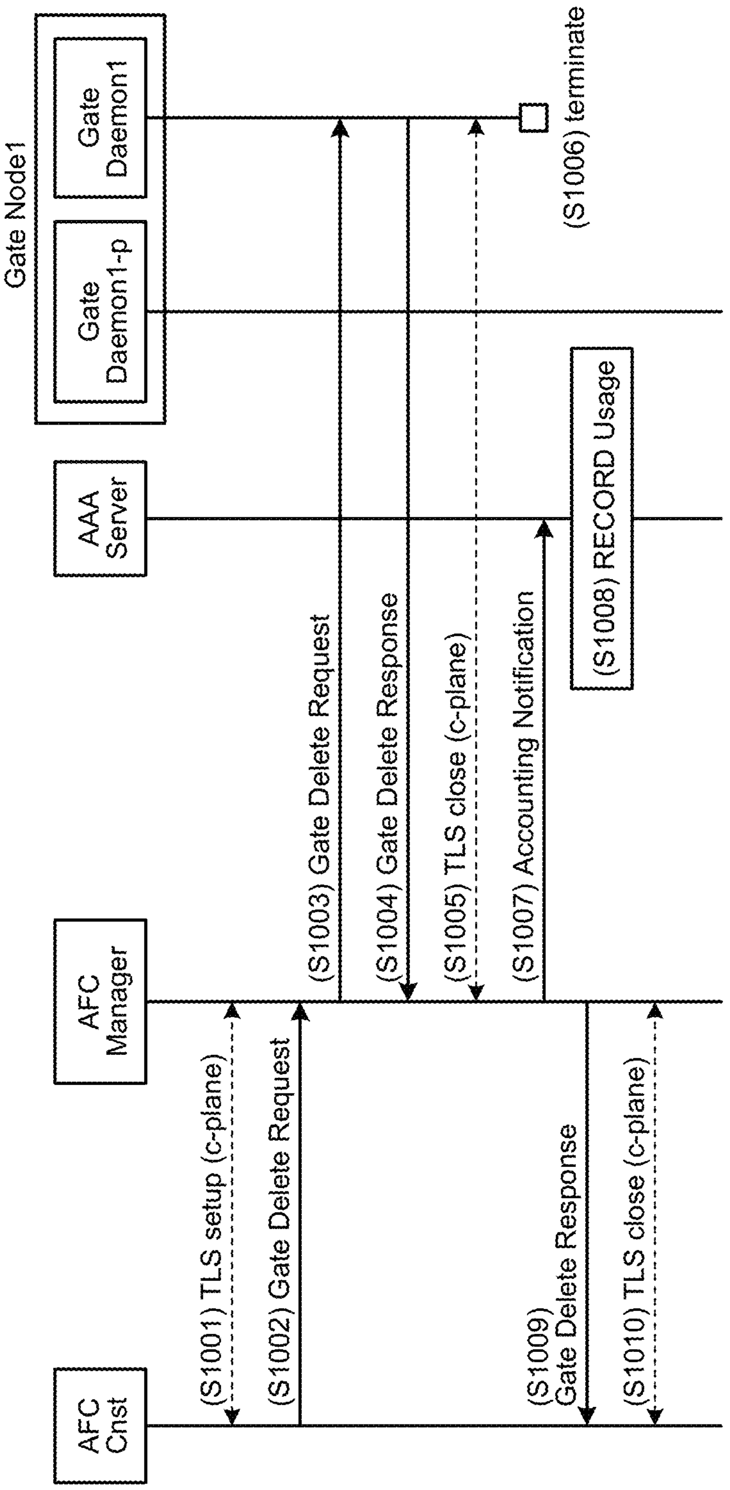
FIG. 83 is a diagram illustrating a processing procedure of Gate Daemon deletion processing.

Next, a procedure in which the AFC Constructor deletes the Gate Daemon will be described with reference to FIG. 83. FIG. 83 is a diagram illustrating a processing procedure of the Gate Daemon deletion processing. Incidentally, FIG. 83 illustrates a case where the Gate Daemon1 is deleted.

First, the AFC Constructor establishes a control TLS connection with the AFC Manager (step S1001).

Then, the AFC Constructor transmits the Gate Delete Request packet illustrated in FIG. 84 to the AFC Manager (step S1002). The values of the fields are as follows. The value of the Packet Type field is "Gate Delete Request". The value of the User ID field is UID-usr0. The value of the AF ID field is AFID-gt1. The value of the Certicate field is Cert-usr0-gt1. As a method of creating Cert-usr0-gt1, it is conceivable to use a result obtained by applying to a hash function a value obtained by adding SKey-usr0-gt1 to this packet.

Then, when receiving the Gate Delete Request packet, the AFC Manager verifies that the AFC user (AFC User0) indicated by the User ID field has the authority to delete the Gate Daemon (Gate Daemon1) indicated by the AF ID field, from the value of the User ID field, the value of the AF ID field, and the value of the Certificate field. Subsequently, the AFC Manager transfers the Gate Delete Request packet to the Gate Daemon1 (step S1003).

When receiving the Gate Delete Request packet, the Gate Daemon1 transmits the Gate Delete Response packet illustrated in FIG. 85 to the AFC Manager (step S1004). The values of the fields are as follows. The value of the Packet Type field is "Gate Delete Response". The value of the Status field is "OK" indicating that the processing is normal.

Then, when receiving the Gate Delete Response packet, the AFC Manager releases the control TLS connection with the Gate Daemon1 (step S1005), and the Gate Daemon1 terminates the operation (step S1006).

Subsequently, the AFC Manager transmits the Accounting Notification packet illustrated in FIG. 86 to the AAA Server (step S1007). The values of the fields are as follows. The value of the Packet Type field is "Accounting Notification". The value of the User ID field is UID-usr0. The value of the Usage field is "Delete Gate" indicating deletion of the Gate Daemon. The value of the AF ID field is AFID-gt1. The value of the AFC ID field is [null].

When receiving the Accounting Notification packet, the AAA Server records the value of the Usage field (step S1008).

Then, the AFC Manager transfers the Gate Delete Response packet to the AFC Constructor (step S1009), and the AFC Constructor releases the control TLS connection with the AFC Manager (step S1010).

Incidentally, in a case where the AFC Constructor deletes the Gate Daemon2, the same procedure as described above is performed.

The embodiment of the present disclosure has been described above. Next, a functional configuration example of a communication device that can function as each application or node according to the embodiment of the present disclosure will be described.

1.3. Functional Configuration Example of Communication Device

Figures 86, 87:
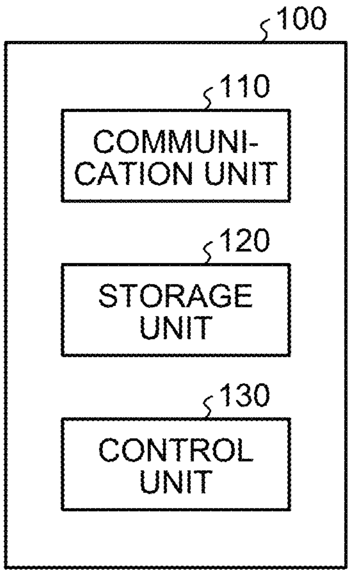
FIG. 86 is a diagram illustrating an exemplary structure of an Accounting Notification packet (deletion of the Gate Daemon1).
FIG. 87 is an explanatory diagram illustrating a functional configuration example of a communication device which can function as each node according to an embodiment of the present disclosure.

FIG. 87 is an explanatory diagram illustrating a functional configuration example of a communication device 100 that can function as each node according to the embodiment of the present disclosure. The communication device 100 illustrated in FIG. 87 includes a communication unit 110, a storage unit 120, and a control unit 130.

The communication unit 110 executes communication between nodes. The communication between nodes may be wired or wireless. From the communication unit 110, the above-described packet and message are transmitted to and received from another node at a predetermined port under the control of the control unit 130.

The storage unit 120 stores various kinds of information and programs used in the above-described AFC architecture. For example, the storage unit 120 stores the above-described various tables. The storage unit 120 can include various memories, an HDD, and the like.

The control unit 130 includes a processor such as a central processing unit (CPU), for example, and executes processing based on the above-described AFC architecture. For example, the control unit 130 executes installation of the Gate Daemon, the AF, and the AFC, granting of the AFC use authority, acquisition of the AFC Session Key, data communication, deletion of the AFC, the AF, and the Gate Daemon, and the like in messaging between applications.

2. Conclusion

As described above, according to the embodiment of the present disclosure, a communication device is provided which is highly convenient in a service for transferring a packet in a network and can cause one or a plurality of functions desired by a service user to act on a packet desired by the service user.

Each step in the processing executed by each device in this specification does not necessarily need to be processed in a time series in the order described as a sequence diagram or a flowchart. For example, each step in the processing executed by each device may be processed in an order different from the order described in the flowchart, or may be processed in parallel.

In addition, a computer program for causing hardware such as a CPU, a read only memory (ROM), and a random access memory (RAM) built in each device to exhibit functions equivalent to the configuration of each device described above can also be created. Further, a storage medium storing the computer program can be provided. Further, by configuring each functional block illustrated in the functional block diagram by hardware, a series of processing can be realized by hardware.

The preferred embodiment of the present disclosure has been described above in detail with reference to the accompanying drawings, but the technical scope of the present disclosure is not limited to such examples. It is obvious that a person with ordinary knowledge in the art to which the present disclosure pertains can come up with various changes or modifications within the scope of the technical idea described in the claims. Of course, it is understood that they belong to the technical scope of the present disclosure.

(Effects)

As described above, the communication device 100 according to the present disclosure is a communication device that operates as an App Node (application node) that executes one or a plurality of AFC Apps (corresponding to an example of an "application"), and includes the communication unit 110 and the control unit 130. The communication unit 110 executes communication with another logical node. The control unit 130 controls communication by the communication unit 110. In addition, the another logical node is a node which is applied with the AFC in which one or a plurality of application functions act on the application message midway along a path of transmission/reception of the application message with the App Node as a transmission source or a transmission destination. In addition, the control unit 130 causes the communication unit 110 to transmit, to the another logical node, a message according to the publishing/subscription model in order to transmit and receive an application message on which the one or more application functions act.

As a result, the communication device 100 is highly convenient in the service of transferring the packet in the network with respect to the transmission and reception of the application message between the AFC Apps, and can cause one or a plurality of functions desired by the service user to act on the packet desired by the service user. For example, the communication device 100 can provide a dynamic network environment with excellent scalability by using the publishing/subscription model.

In addition, in a case where the AFC App which is the transmission source of the application message operates in the App Node, the control unit 130 causes the communication unit 110 to transmit the message by a publishing request packet (for example, the Publish Request packet) to the another logical node (for example, the Gate Node1) positioned at the subsequent stage of the App Node. In a case where the AFC App which is the transmission destination of the application message operates in the App Node, the control unit causes the communication unit 110 to receive the message by a subscription request packet (for example, the Subscribe Request packet) from the another logical node (for example, the Gate Node2) positioned at the preceding stage of the App Node.

As a result, the communication device 100 can lower the degree of coupling between the App Node1 side and the App Node2 side, for example, and provide a dynamic network environment with excellent scalability.

In addition, in a case where the AFC App which is the transmission source of the application message operates in the App Node, the control unit 130 causes the communication unit 110 to transmit the application message to the another logical node (for example, the Gate Node1) positioned at the subsequent stage of the App Node by using a POST method in the HTTP communication. In a case where the AFC App which is the transmission destination of the application message operates in the App Node, the control unit causes the communication unit 110 to receive the message from the another logical node (for example, the Gate Node2) positioned at the preceding stage of the App Node by using a GET method in the HTTP communication.

As a result, the communication device 100 can lower the degree of coupling between the App Node1 side and the App Node2 side, and provide a dynamic network environment with excellent scalability. In addition, by using HTTP communication, it is possible to contribute to improvement of responsiveness.

In addition, the communication device 100 according to the present disclosure operates as a logical node (for example, the Gate Daemon or the AF Node) including the communication unit 110 and the control unit 130. The communication unit 110 executes communication with an App Node which executes one or a plurality of AFC Apps. The control unit 130 applies the AFC in which one or a plurality of application functions act on the application message midway along a transmission/reception path of the application message with the App Node as the transmission source or the transmission destination. In addition, in a case where the application function acts on the application message having the App Node as the transmission source or the transmission destination, the control unit 130 causes the communication unit 110 to receive all of one or a plurality of packets configuring the application message, and then causes the application function to act in units of one or a plurality of packets configuring the application message.

As a result, the communication device 100 is highly convenient in the service of transferring the packet in the network with respect to the transmission and reception of the application message between the AFC Apps, and can cause one or a plurality of functions desired by the service user to act on the packet desired by the service user. For example, the communication device 100 executes the processing by the AF in units of one or a plurality of packets configuring the application message, that is, for each application message instead of each sequential packet, and thus it is possible to contribute to reduction of the processing load.

In addition, the communication device 100 according to the present disclosure operates as a management node (for example, the AFC Manager) including the communication unit 110 and the control unit 130. The communication unit 110 executes communication with the accounting node in association with transmission and reception of an application message in which the App Node which executes one or a plurality of AFC Apps is the transmission source or the transmission destination. The control unit 130 manages another logical node. In addition, the another logical node is a logical node which controls communication by the communication unit 110 and is applied with the AFC in which one or a plurality of application functions act on the application message midway along a path of transmission/reception of the application message with the App Node as the transmission source or the transmission destination is applied, and is, for example, a Gate Node or an AF Node. In addition, in a case where the application function is caused to act on the application message with the App Node as the transmission source or the transmission destination, the control unit 130 generates a packet (for example, the Accounting Notification packet) indicating a resource used for causing the application function to act and causes the communication unit 110 to transmit the packet to the accounting node.

As a result, the communication device 100 is highly convenient in the service of transferring the packet in the network with respect to the transmission and reception of the application message between the AFC Apps, and can cause one or a plurality of functions desired by the service user to act on the packet desired by the service user. For example, regarding transmission and reception of the application message, the communication device 100 can enable charge management or the like for each application function for the user.

In addition, the control unit 130 causes the communication unit 110 to transmit a packet indicating a resource used for acting the application function toward the AAA Server (corresponding to an example of a "server device") operating as the accounting node which executes accounting of the user of the AFC Apps operating in the App Node serving as the transmission source or the transmission destination.

As a result, the communication device 100 can cause the AAA Server to perform accounting in the AFC collectively.

In addition, the resource indicated by the packet indicates at least one of the use of the resource used to cause the application function to act and the amount of the resource used. At least one of one or a plurality of logical nodes to which the AFC managed by the control unit 130 is applied is set as the use of the resource. In other words, for example, "Gate Setup", "AF Setup", "AFC Setup", and the like indicating that the Gate Daemon, the AF, the AFC, and the like are installed are set. In addition, the amount of the resource includes at least one of a size of the application message and an execution time of the application function.

As a result, the communication device 100 can cause, for example, the AAA Server to collectively manage the calculation resource in the AFC including the use of the resource, the amount of the resource used, and the like.

In addition, the communication device 100 according to the present disclosure is a communication device (for example, the AFC Constructor) that operates as an App Node that executes one or a plurality of AFC Apps, and includes the communication unit 110 and the control unit 130. The communication unit 110 executes communication with another management node. The control unit 130 controls communication by the communication unit 110. In addition, the another management node is a node which manages the AFC in which one or a plurality of application functions act on the application message midway along a path of transmission/reception of the application message with the own application node or another application node as a transmission source or a transmission destination, and a logical node to which such AFC is applied. In addition, in the case of a creator who has created, via the another management node, a node in which the own application node exists midway along the transmission/reception path and to which the AFC is applied, the control unit 130 generates a packet (for example, the AFC Permission Request packet) for granting an authority to use the logical node in which the AFC is applied to the App Node serving as the transmission source or the transmission destination of the application message, and causes the communication unit 110 to transmit the packet.

With this configuration, in the transmission/reception of an application message between Apps, the communication device 100 is highly convenient in a service for transferring a packet in the network, and can cause one or a plurality of functions desired by the service user to act on a packet desired by the service user. For example, the communication device 100 can contribute to security enhancement by dynamically granting a use authority as appropriate in the transmission/reception of an application message between Apps.

Incidentally, the effects described in this specification are merely examples and are not limited, and other effects may be present.

Incidentally, the present technology may also be configured as below.

(1)

A communication device which operates as an application node which executes one or a plurality of applications, the device comprising:

a communication unit that executes communication with another logical node; and a control unit that controls communication by the communication unit, wherein the another logical node is a node which is applied with application function chaining (AFC) in which, in transmission/reception of an application message with the application node as a transmission source or a transmission destination, one or a plurality of application functions act on the application message midway along a path of the transmission/reception, and the control unit causes the communication unit to transmit, to the another logical node, a message according to a publishing/subscription model in order to transmit and receive the application message on which the one or the plurality of application functions act.

(2)

The communication device according to (1), wherein the control unit causes the communication unit to transmit the message by a publishing request packet to the another logical node positioned at a subsequent stage of the application node in a case where an application serving as a transmission source of the application message operates in the application node, and causes the communication unit to receive the message by a subscription request packet from the another logical node positioned at a preceding stage of the application node in a case where an application serving as a transmission destination of the application message operates in the application node.

(3)

The communication device according to (1), wherein the control unit causes the communication unit to transmit the application message to the another logical node positioned at a subsequent stage of the application node by using a POST method in a hypertext transfer protocol (HTTP) communication in a case where an application serving as a transmission source of the application message operates in the application node, and causes the communication unit to receive the message from the another logical node positioned at a preceding stage of the application node by using a GET method in the HTTP communication in a case where an application serving as a transmission destination of the application message operates in the application node.

(4)

A communication device which operates as a logical node, the device comprising:

a communication unit that executes communication with an application node which executes one or a plurality of applications; and a control unit that applies application function chaining (AFC) in which one or a plurality of application functions act on an application message midway along a path of transmission/reception of the application message with the application node as a transmission source or a transmission destination, wherein in a case where the application function acts on the application message with the application node as the transmission source or the transmission destination, the control unit causes the communication unit to receive all of one or a plurality of packets configuring the application message and then causes the application function to act in units of the one or the plurality of packets configuring the application message.

(5)

A communication device which operates as a management node, the device comprising:

a communication unit that executes communication with an accounting node in association with transmission and reception of an application message with an application node which executes one or a plurality of applications as a transmission source or a transmission destination; and a control unit that manages another logical node, wherein the another logical node is a logical node which controls the communication by the communication unit and is applied with application function chaining (AFC) in which one or a plurality of application functions act on the application message midway along a path of transmission/reception of the application message with the application node as the transmission source or the transmission destination, and in a case where the application function is caused to act on the application message with the application node as the transmission source or the transmission destination, the control unit generates a packet indicating a resource used to cause the application function to act and causes the communication unit to transmit the packet to the accounting node.

(6)

The communication device according to (5), wherein the control unit causes the communication unit to transmit a packet indicating a resource used to cause the application function to act toward a server device operating as the accounting node which executes accounting of a user of an application operating in the application node serving as the transmission source or the transmission destination.

(7)

The communication device according to (5) or (6), wherein the resource indicated by the packet indicates at least one of a use of a resource used to cause the application function to act and an amount of the resource used, at least one of one or a plurality of logical nodes to which the AFC managed by the control unit is applied is set as the use of the resource, and the amount of the resource includes at least one of a size of the application message and an execution time of the application function.

(8)

A communication device which operates as an application node which executes one or a plurality of applications, the device comprising:

a communication unit that executes communication with another management node; and a control unit that controls communication by the communication unit, wherein the another management node is a node which manages application function chaining (AFC) in which one or a plurality of application functions act on an application message midway along a path of transmission/reception of the application message with an own application node or another application node as a transmission source or a transmission destination, and a logical node to which the AFC is applied, and in case of a creator who has created, via the another management node, a node in which the own application node exists in the path of the transmission/reception and to which the AFC is applied, the control unit generates a packet which grants an authority to use the logical node applied with the AFC to the another application node serving as the transmission source or the transmission destination of the application message and causes the communication unit to transmit the packet.

(9)

A communication method using a communication device which operates as an application node which executes one or a plurality of applications, the method comprising:

executing communication with another logical node; and controlling the communication with the another logical node, wherein the another logical node is a node which is applied with application function chaining (AFC) in which, in transmission/reception of an application message with the application node as a transmission source or a transmission destination, one or a plurality of application functions act on the application message midway along a path of the transmission/reception, and the controlling means to transmit, to the another logical node, a message according to a publishing/subscription model in order to transmit and receive the application message on which the one or the plurality of application functions act.

(10)

A communication method using a communication device which operates as a logical node, the method comprising:

executing communication with an application node which executes one or a plurality of applications; and applying application function chaining (AFC) in which one or a plurality of application functions act on an application message midway along a path of transmission/reception of the application message with the application node as a transmission source or a transmission destination, wherein the applying means to receive all of one or a plurality of packets configuring the application message and then cause the application function to act in units of the one or the plurality of packets configuring the application message in a case where the application function acts on the application message with the application node as the transmission source or the transmission destination.

(11)

A communication method using a communication device which operates as a management node, the method comprising:

executing communication with an accounting node in association with transmission and reception of an application message with an application node which executes one or a plurality of applications as a transmission source or a transmission destination; and managing another logical node, wherein the another logical node is a logical node which controls the communication with the accounting node and is applied with application function chaining (AFC) in which one or a plurality of application functions act on the application message midway along a path of transmission/reception of the application message with the application node as the transmission source or the transmission destination, and the managing means to generate a packet indicating a resource used to cause the application function to act and transmit the packet to the accounting node in a case where the application function is caused to act on the application message with the application node as the transmission source or the transmission destination.

(12)

A communication method using a communication device which operates as an application node which executes one or a plurality of applications, the method comprising:

executing communication with another management node; and controlling the communication with the another management node, wherein the another management node is a node which manages application function chaining (AFC) in which one or a plurality of application functions act on an application message midway along a path of transmission/reception of the application message with an own application node or another application node as a transmission source or a transmission destination, and a logical node to which the AFC is applied, and the controlling means to generate a packet which grants an authority to use the logical node applied with the AFC to the another application node serving as the transmission source or the transmission destination of the application message and transmit the packet in case of a creator who has created, via the another management node, a node in which the own application node exists in the path of the transmission/reception and to which the AFC is applied.

REFERENCE SIGNS LIST

100 Communication Device
110 Communication Unit
120 Storage Unit
130 Control Unit

The invention claimed is:

1. A communication device which operates as an application node which executes one or a plurality of applications, the device comprising:

a communication circuit that executes communication with a plurality of other logical nodes; and a control circuit that controls the communication by the communication circuit, wherein the plurality of other logical nodes are logical nodes which are applied with application function chaining (AFC) in which, when transmitting or receiving an application message having the application node as a transmission source or a transmission destination, respectively, one or a plurality of application functions in each of the plurality of other logical nodes act on the application message midway along corresponding transmission paths or reception paths of the application message through the plurality of other logical nodes, and the control circuit causes the communication circuit to transmit, to each of the plurality of other logical nodes, an AFC designation message according to a publishing/subscription model in order for the plurality of other logical nodes to respectively transmit or receive the application message to or from the application node, wherein the AFC designation message designates a type of AFC to be used by the plurality of other logical nodes, and wherein the publishing/subscription model indicates to the plurality of other logical nodes whether the application node is on an ingress side or an egress side of the plurality of other logical nodes.

2. The communication device according to claim 1, wherein the control circuit causes the communication circuit to transmit the AFC designation message by a publishing request packet to the plurality of other logical nodes based on the plurality of other logical nodes being positioned at a subsequent stage of the application node in a case where an application serving as the transmission source of the application message operates in the application node, and causes the communication circuit to receive the AFC designation message by a subscription request packet from the plurality of other logical nodes based on the plurality of other logical nodes being positioned at a preceding stage of the application node in a case where an application serving as the transmission destination of the application message operates in the application node.

3. The communication device according to claim 1, wherein the control circuit causes the communication circuit to transmit the application message to the plurality of other logical nodes based on the plurality of other logical nodes being positioned at a subsequent stage of the application node by using a POST method in a hypertext transfer protocol (HTTP) communication in a case where an application serving as the transmission source of the application message operates in the application node, and causes the communication circuit to receive the application message from the plurality of other logical nodes based on the plurality of other logical nodes being positioned at a preceding stage of the application node by using a GET method in the HTTP communication in a case where an application serving as the transmission destination of the application message operates in the application node.

4. A communication method using a communication device which operates as an application node which executes one or a plurality of applications, the method comprising:

executing communication with a plurality of other logical nodes; and controlling the communication with the plurality of other logical nodes, wherein the plurality of other logical nodes are logical nodes which are applied with application function chaining (AFC) in which, when transmitting or receiving an application message having the application node as a transmission source or a transmission destination, respectively, one or a plurality of application functions in each of the plurality of other logical nodes act on the application message midway along corresponding transmission paths or reception paths of the application message through the plurality of other logical nodes, and the communication with the another logical node includes transmitting, to each of the plurality of other logical nodes, an AFC designation message according to a publishing/subscription model in order for the plurality of other logical nodes to respectively transmit or receive the application message to or from the application node, wherein the AFC designation message designates a type of AFC to be used by the plurality of other logical nodes, and wherein the publishing/subscription model indicates to the plurality of other logical nodes whether the application node is on an ingress side or an egress side of the plurality of other logical nodes.

* * * * *